(12) United States Patent
Park et al.

(10) Patent No.: US 6,952,583 B1
(45) Date of Patent: Oct. 4, 2005

(54) METHOD FOR PROCESSING SYNCHRONOUS MESSAGE IN ASYNCHRONOUS MOBILE COMMUNICATION SYSTEM

(75) Inventors: Jae-Hong Park, Ichon-shi (KR); Ho-Geun Lee, Ichon-shi (KR); Jeong-Hwa Ye, Ichon-shi (KR); Yu-Ro Lee, Ichon-shi (KR); Woon-Hee Hwang, Espoo (FI)

(73) Assignee: UTStarcom, Inc., Alameda, CA (US)

( * ) Notice: Subject to any disclaimer, the term of this patent is extended or adjusted under 35 U.S.C. 154(b) by 691 days.

(21) Appl. No.: 09/692,065

(22) Filed: Oct. 19, 2000
(Under 37 CFR 1.47)

(30) Foreign Application Priority Data

| Oct. 19, 1999 | (KR) | 1999-45391 |
| Nov. 1, 1999 | (KR) | 1999-47977 |

(51) Int. Cl.[7] .................. H04Q 7/20; H04Q 7/38
(52) U.S. Cl. ............... 455/434; 455/426.1; 455/435.2; 455/500; 455/502; 455/515; 370/498; 370/503; 370/509; 370/510; 370/298; 370/299
(58) Field of Search ........................... 455/434, 422.1, 455/403, 3.02, 500, 502, 517, 3.01, 3.03, 455/3.05, 426.1, 426.2, 433, 435.1, 550.1, 455/445, 454, 435.2, 455, 552.1, 464, 515; 370/503, 480, 498, 509, 510, 514, 345, 350, 370/298, 304, 299

(56) References Cited

U.S. PATENT DOCUMENTS

| 6,055,639 A | 4/2000 | Schanze | 713/201 |
| 6,072,611 A | 6/2000 | Hansen et al. | 359/119 |
| 6,094,670 A | 7/2000 | Tanaka et al. | 709/201 |
| 6,097,304 A | 8/2000 | Hamada | 340/825.06 |
| 6,115,383 A | 9/2000 | Bell et al. | 370/400 |
| 6,208,862 B1 * | 3/2001 | Lee | 455/442 |
| 6,430,168 B1 * | 8/2002 | Djurkovic et al. | 370/331 |
| 6,526,039 B1 * | 2/2003 | Dahlman et al. | 370/350 |
| 2002/0122396 A1 * | 9/2002 | Terasawa | 370/331 |

FOREIGN PATENT DOCUMENTS

| JP | 513901 | 11/2003 |
| WO | 9806226 | 2/1998 |
| WO | 9830042 | 7/1998 |
| WO | 9837722 | 8/1998 |
| WO | 0035107 | 6/2000 |
| WO | 0060895 | 10/2000 |

OTHER PUBLICATIONS

Architectural Aspects for the Evolution of Mobile Communications Toward UMTS by Berruto et al.; (XP 000721279) Communications, vol. 15, No. 8, Oct. 1997; pp. 1477-1486.

* cited by examiner

*Primary Examiner*—Keith Ferguson
(74) *Attorney, Agent, or Firm*—McDonnell Boehnen Hulbert & Berghoff LLP

(57) ABSTRACT

A method for processing a synchronous message in an asynchronous mobile communication system including an asynchronous mobile station and an asynchronous radio network, comprises the steps of: when a synchronous core network is interlocked with the asynchronous radio network, generating a system information block based on a header information provided from the synchronous core network; formatting the generated information block into a system information message; and transmitting the system information message to the asynchronous mobile station via a channel.

7 Claims, 35 Drawing Sheets

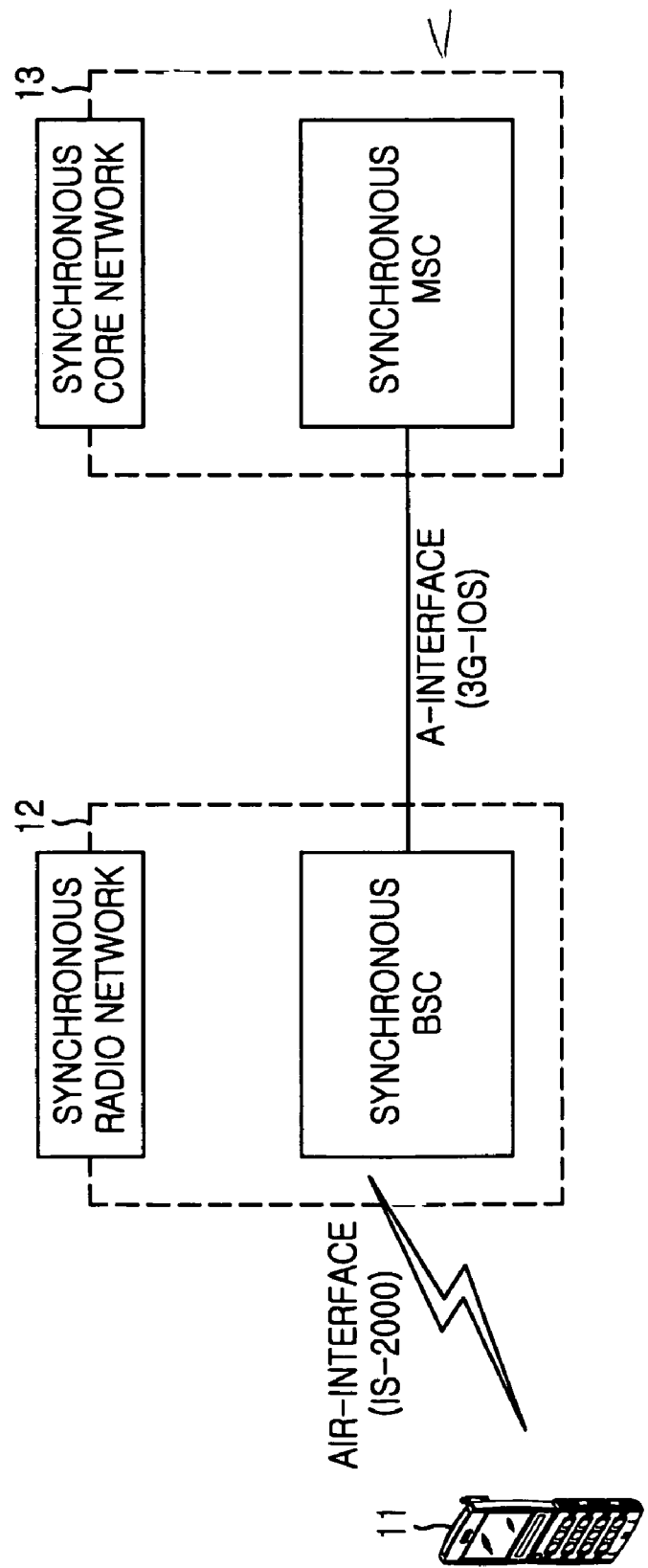

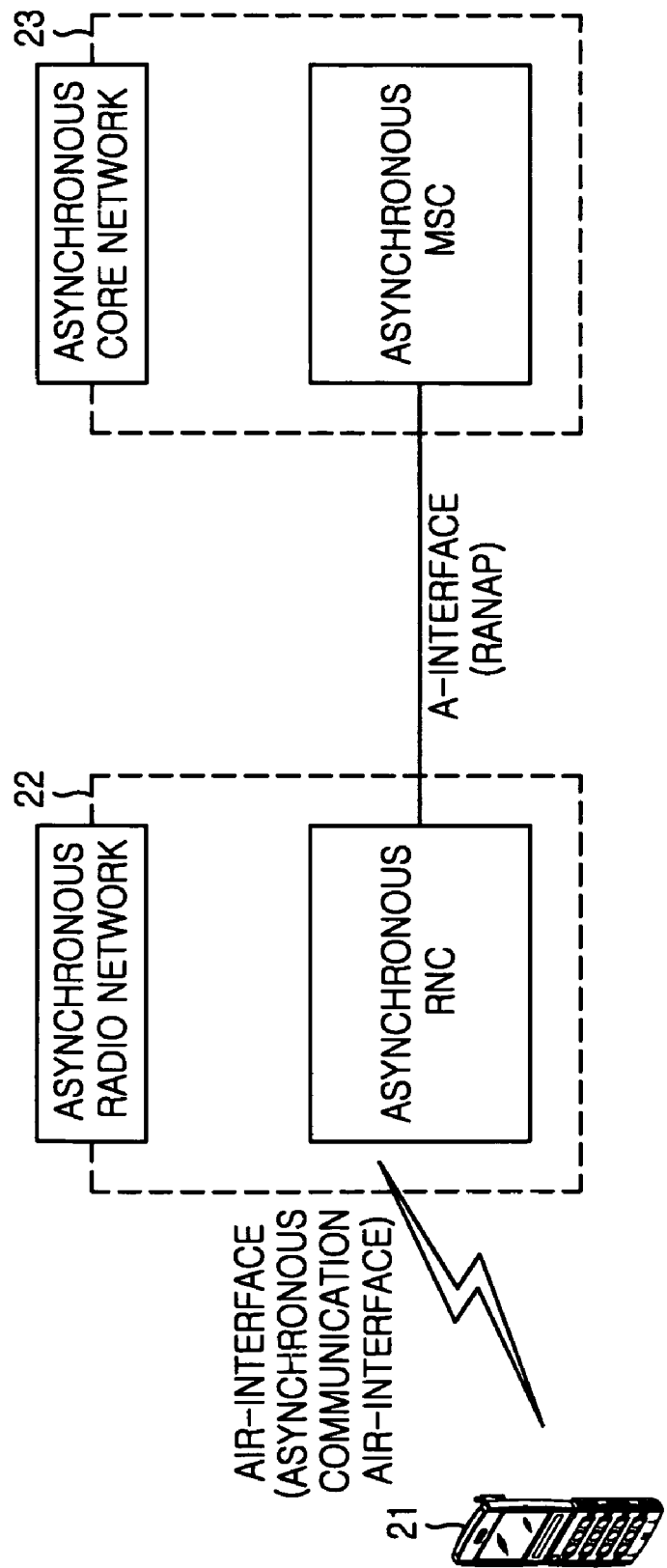

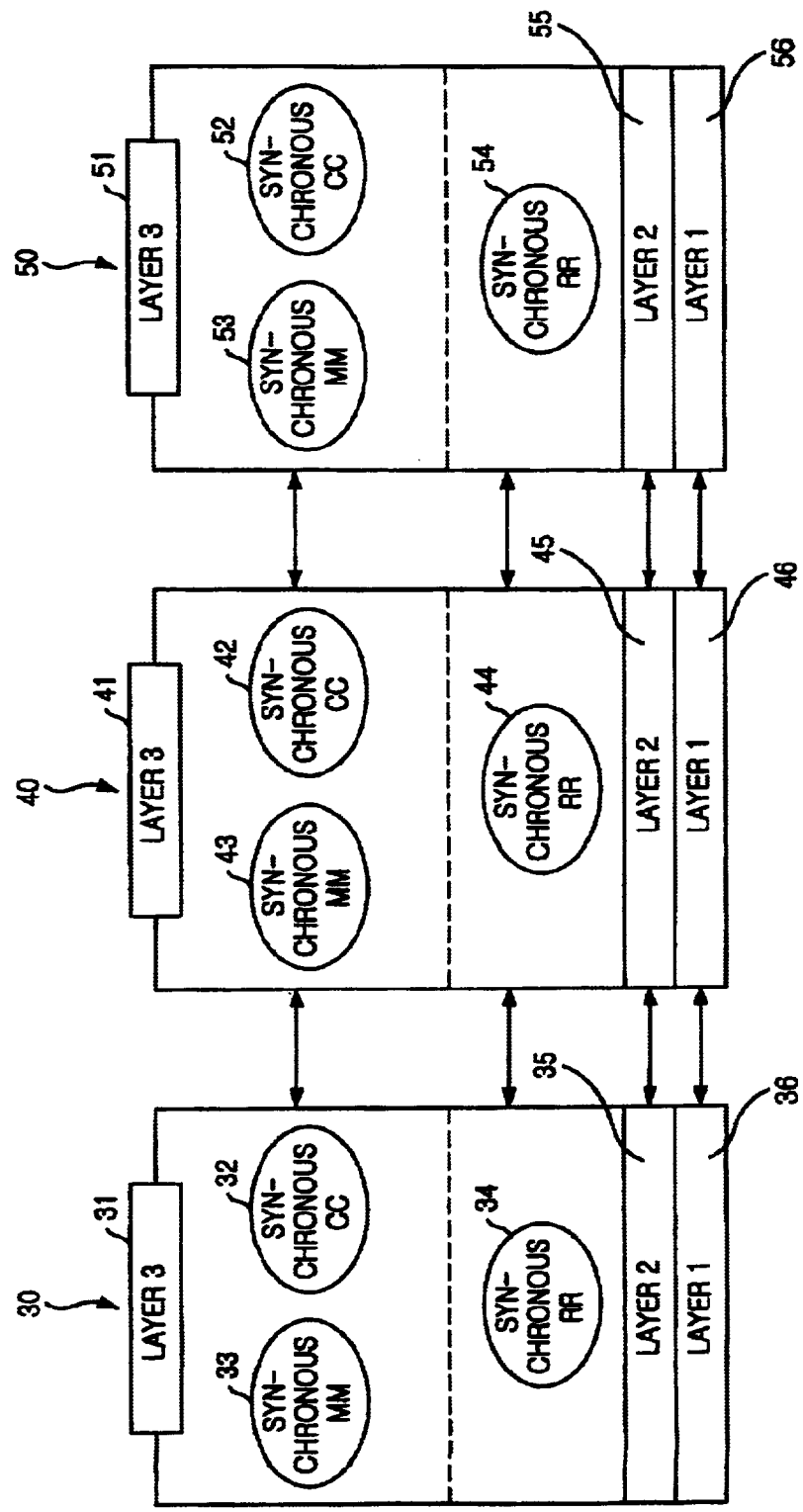

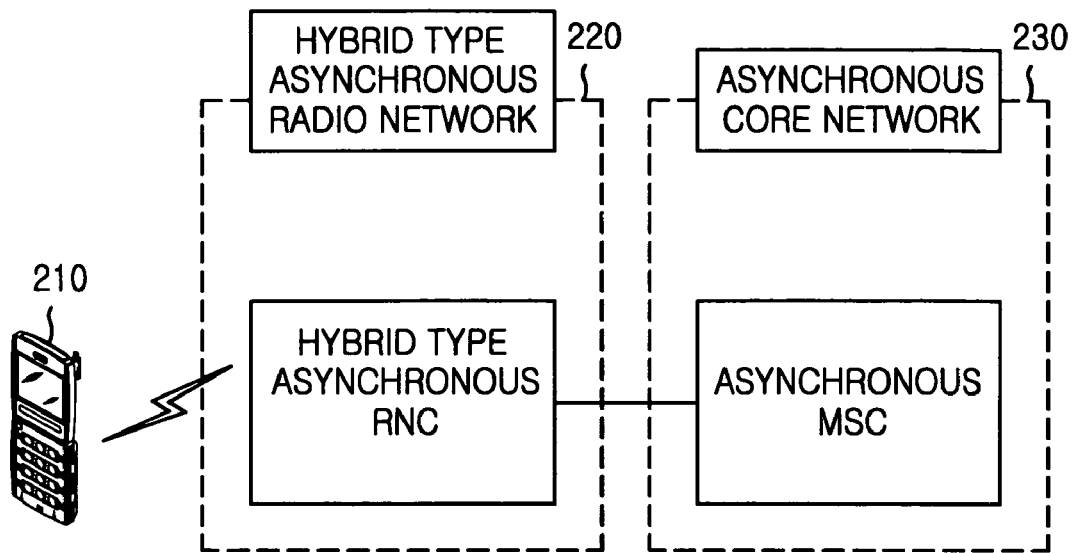
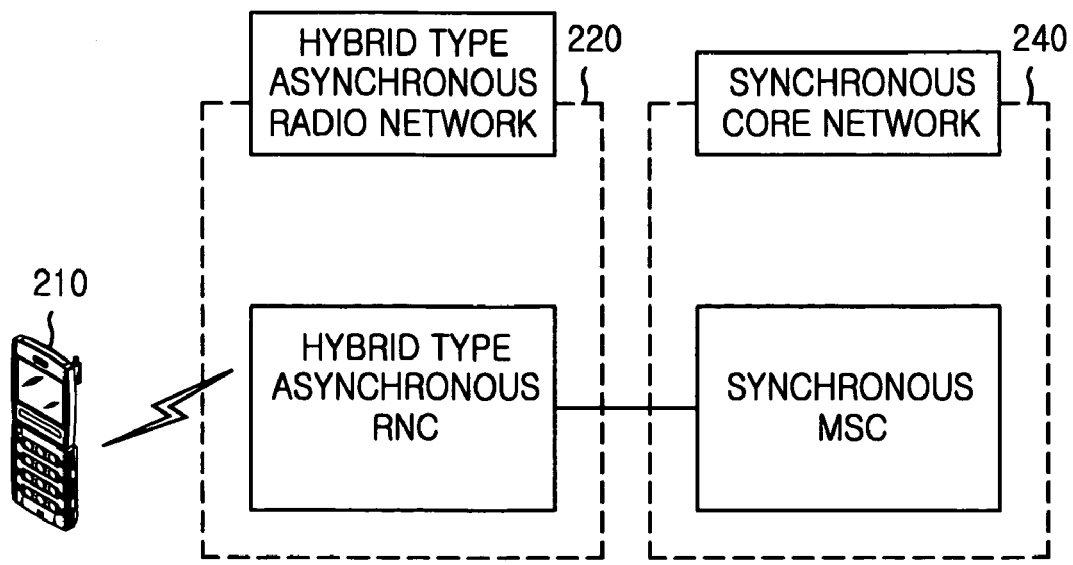
FIG. 3B

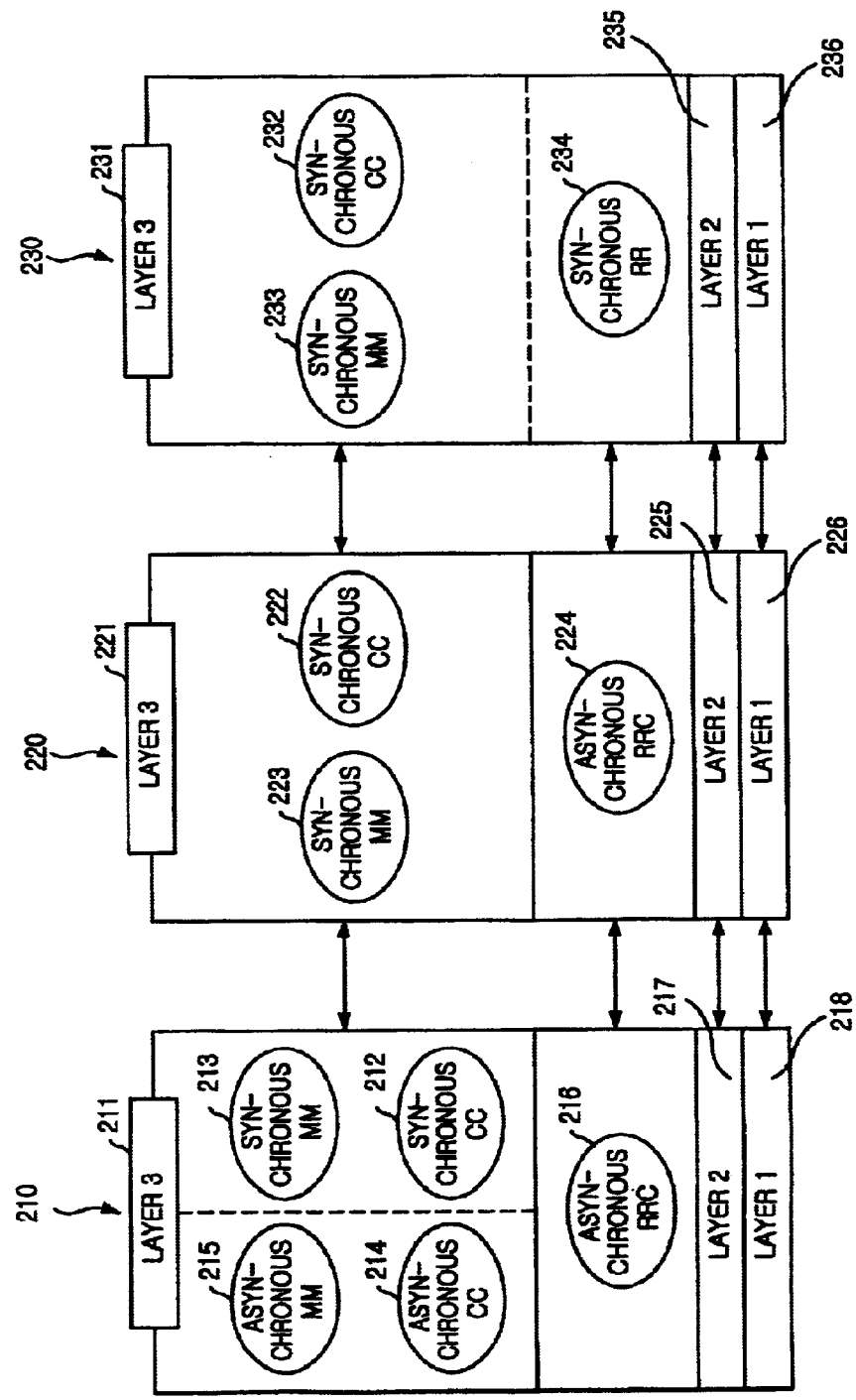

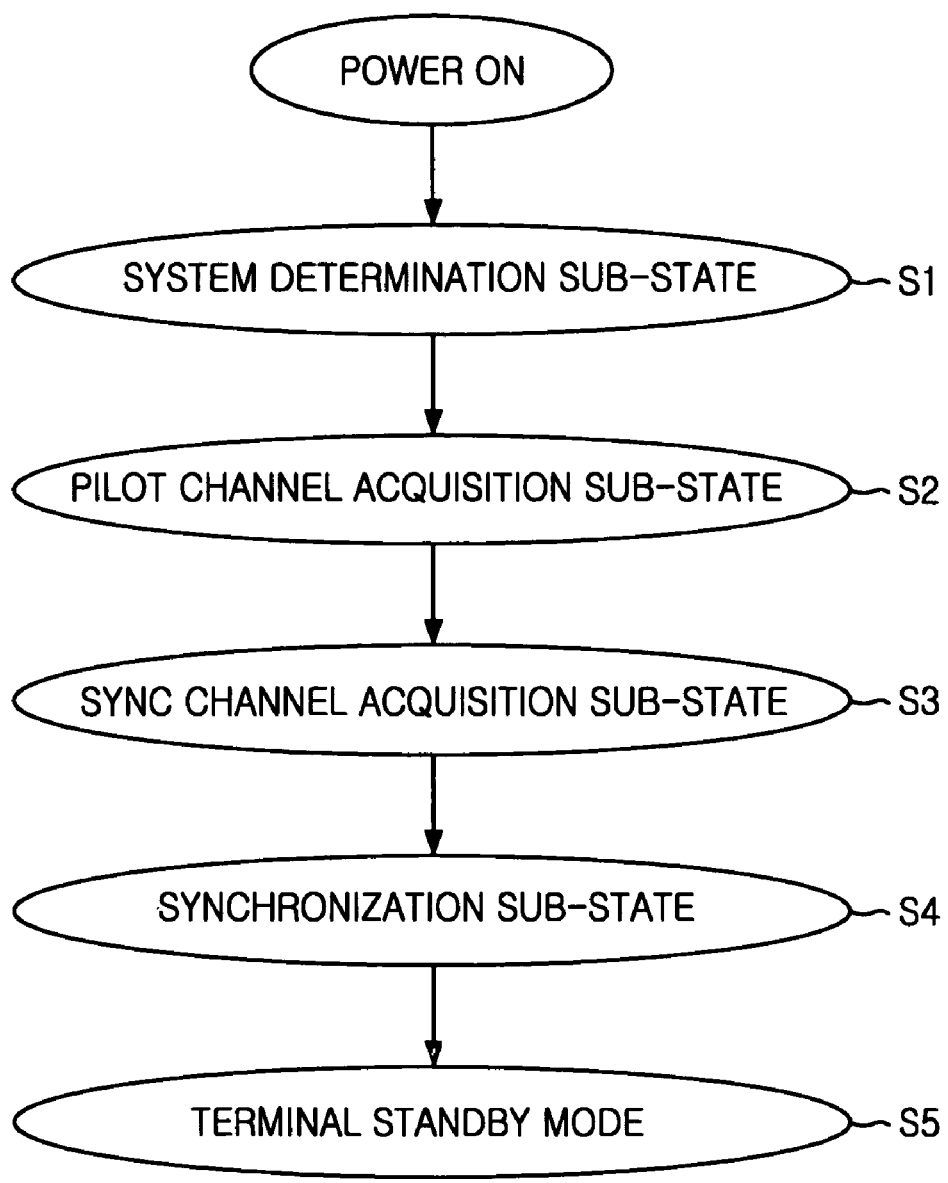

FIG. 7
(PRIOR ART)

| Private neighbor List Message ||
|---|---|
| CONFIG_MSG_SEQ(6 bits) | PRI_NGHBR_PN(9 bits) |
| COMMON_INCL(1 bit) | BAND_CLASS(0 or 5 bits) |
| COMMON_BAND_CLASS(0 or 5 bits) | NGHBR_FREQ(0 or 11 bits) |
| COMMON_NGHBR_FREQ(0 or 11 bits) | UZID_INCL(1 bit) |
| SRCH_WIN_PN(4 bits) | NUM_UZID(0 or 6 bits) |
| NUM_PRI_NGHBR(6 bits) | UZID(0 or 16 bits) |
| SID(15 bits) | UZ_REV(0 or 4 bits) |
| NID (16 bits) | TEMP_SIB(0 or 1 bit) |

FIG. 8
(PRIOR ART)

| System Parameters Message |||
|---|---|---|
| PILOT_PN ( 9 bits ) | FOR_NID_REG ( 1 bit ) | PWR_REP_DELAY ( 5 bits ) |
| CONFIG_MSG_SEQ ( 6 bits ) | POWER_UP_REG ( 1 bit ) | RESCAN ( 1 bit ) |
| SID ( 15 bits ) | PARAMETER_REG ( 1 bit ) | T_ADD ( 6 bits ) |
| NID ( 16 bits ) | REG_PRD ( 7 bits ) | T_DROP ( 6 bits ) |
| REG_ZONE ( 12 bits ) | BASE_LAT ( 22 bits ) | T_COMP ( 4 bits ) |
| TOTAL_ZONES ( 3 bits ) | BASE_LONG ( 23 bits ) | T_TDROP ( 4 bits ) |
| ZONE_TIMER ( 3 bits ) | REG_DIST ( 11 bits ) | EXT_SYS_PARAMETER ( 1 bit ) |
| MULT_SIDS ( 1 bit ) | SRCH_WIN_A ( 4 bits ) | EXT_NGHBR_LIST ( 1 bit ) |
| MULT_NIDS ( 1 bit ) | SRCH_WIN_N ( 4 bits ) | GEN_NGHBR_LIST ( 1 bit ) |
| BASE_ID ( 16 bits ) | SRCH_WIN_R ( 4 bits ) | GLOBAL_REDIRECT ( 1 bit ) |
| BASE_CLASS ( 4 bits ) | NGHBR_MAX_AGE ( 4 bits ) | PRI_NGHBR_LIST ( 1 bit ) |
| PAGE_CHAN ( 3 bits ) | PWR_REP_THRESH ( 5 bits ) | USER_ZONE_ID ( 1 bit ) |
| MAX_SLOT_CYCLE_INDEX ( 3bits ) | PWR_REP_FRAMES ( 4 bits ) | EX_GLOBAL_REDIRECT ( 1 bit ) |
| HOME_REG ( 1 bit ) | PWR_THRESH_ENABLE( 1 bit ) | EXT_CHAN_LIST ( 1 bit ) |
| FOR_SID_REG ( 1 bit ) | PWR_PERIOD_ENABLE ( 1 bit ) | |

FIG. 9
(PRIOR ART)

| Extended Global Service Redirection Message | |
|---|---|
| PILOT_PN(9 bits) | RECORD_LEN(8 bits) |
| CONFIG_MSG_SEQ(6 bits) | Type-specific fieds (8 * RECORD_LEN) |
| REDIRECT_ACCOLC(16 bits) | EXPECTED_SID(15 bits) |
| RETURN_IF_FAIL(1 bit) | EXPECTED_NID (16 bits) |
| DELETE_TMSI(1 bit) | BAND_CLASS(5 bits) |
| REDIRECT_P_REV_INCL(1 bit) | NUM_CHANS(4 bits) |
| EXCL_P_REV_INC(0 or 1 bit) | CDMA_CHAN(11 bits) |
| REDIRECT_P_MIN(0 or 8 bits) | IGNORE_CDMA(1 bits) |
| REDIRECT_P_MAX(0 or 8 bits) | SYS_ORDERING(3 bits) |
| RECORED_TYPE(8 bits) | MAX_REDIRECT_DELAY(5 bits) |

FIG. 10
(PRIOR ART)

| Extended System Parameters Message | | |
|---|---|---|
| PILOT_PN ( 9 bits ) | P_REV ( 8 bits ) | NGHBR_SET_ENTRY_INFO ( 1 bit |
| CONFIG_MSG_SEQ ( 6 bits ) | MIN_P_REV ( 8 bits ) | ACC_ENT_HO_ORDER ( 0 or 1 bit |
| DELETE_FOR_TMSI ( 1 bit ) | SOFT_SLOPE ( 6 bits ) | NGHBR_SET_ACCESS_INFO( 1 bit |
| USE_TIMSI ( 1 bit ) | ADD_INTERCEPT ( 6 bits ) | ACCESS_HO ( 0 or 1 bit ) |
| PREF_MSID_TYPE ( 2 bits ) | DROP_INTERCEPT ( 6 bits ) | ACCESS_HO_MSG_RSP ( 0 or 1 bit ) |
| MCC ( 10 bits ) | PACKET_ZONE_ID ( 8 bits ) | ACCESS_PROBE_HO ( 0 or 1 bit ) |
| IMSI_11_12 ( 7 bits ) | MAX_NUM_ALT_SO ( 3 bits ) | ACC_HO_LIST_UPD ( 0 or 1 bit ) |
| TMSI_ZONE_LEN ( 4 bits ) | RESELECT_INCLUDED ( 1 bit ) | ACC_PROBE_HO_OTHER_MSG ( 0 or 1 bit ) |
| TMSI_ZONE ( 8 * TMSI_ZONE_LEN | EC_THRESH ( 0 or 5 bits ) | NGHBR_SET_SIZE ( 0 or 6 bits ) |
| BCAST_INDEX ( 3 bits ) | EX_IO_THRESH ( 0 or 5 bits ) | MSX_NUM_PROBE_HO ( 0 or 3 bits ) |
| IMSI_T_SUPPORTED ( 1 bit ) | PILOT_REPORT ( 1 bit ) | |

FIG. 11
(PRIOR ART)

| Global Service Redirection Message ||
|---|---|
| CONFIG_MSG_SEQ(6 bits) | EXPECTED_SID(15 bits) |
| REDIRECT_ACCOLC(16 bits) | EXPECTED_NID(16 bits) |
| RETURN_IF_FAIL(1 bit) | BAND_CLASS(5 bits) |
| DELETE_TMSI(1 bit) | NUM_CHANS(4 bits) |
| EXCL_P_REV_MS(1 bit) | CDMA_CHAN(11 bits) |
| RECORD_TYPE(8 bits) | IGNORE_CDMA(1 bits) |
| RECORD_LEN(8 bits) | SYS_ORDERING(3 bits) |
| Type-specific fields (8 * RECORD_LEN) | MAX_REDIRECT_DELAY(5 bits) |

FIG. 12

| USER ZONE IDENTIFICATION | | | |
|---|---|---|---|
| FIELD | CLASS | FIELD | CLASS |
| CONFIG_MSG_SEQ | Non-RRC | UZID | Non-RRC |
| UZ_EXIT | Non-RRC | UZ_REV | Non-RRC |
| NUM_UZID | Non-RRC | TEMP_SUB | Non-RRC |

RRC : INFORMATION FIELD RELATED TO RADIO RESOURCE

Non-RRC : INFORMATION FIELD UNRELATED TO RADIO RESOURCE

FIG. 13

| Information Element | Presence | Range | IE type and reference | Semantics description |
|---|---|---|---|---|
| Other Information elements | | | | |
| Value tag | Mandatory | | | |
| References to other system information blocks | | 0 <maxSysInfoBlockcount> | | |
| | | | | |
| Scheduling information | Mandatory | | | |
| User Zone identification Elements | | | | |
|    CONFIG_MSG_SEQ | Mandatory | | | |
|    UZ_EXIT | Mandatory | | | |
|    NUM_UZID | Mandatory | | | |
|    UZID | Conditional | | | NUM_UZID occurrences |
|    UZ_REV | Conditional | | | NUM_UZID occurrences |
|    TEMP_SUB | Conditional | | | NUM_UZID occurrences |

FIG. 16

| PRIVATE NEIGHBOR MESSAGE | | | |
|---|---|---|---|
| FIELD | CLASS | FIELD | CLASS |
| CONFIG_MSG_SEQ | RCC | PRI_NGHBR_PN | RCC |
| COMMON_INCL | RCC | BAND_CLASS | RCC |
| COMMON_BAND_CLASS | RCC | NGHBR_FREQ | RCC |
| COMMON_NGHBR_FREQ | RCC | UZIP_INCL | Non-RRC |
| SRCH_WIN_PN | RCC | NUM_UZID | Non-RRC |
| NUM_PN_NGHBR | RCC | UZID | Non-RRC |
| SID | Non-RRC | UZ_REV | Non-RRC |
| NID | Non-RRC | TEMP_SUB | Non-RRC |

RRC : INFORMATION FIELD RELATED TO RADIO RESOURCE

Non-RRC : INFORMATION FIELD UNRELATED TO RADIO RESOURCE

FIG. 17

| Information Element | Presence | Range | IE type and reference | Semantics description |
|---|---|---|---|---|
| Other Information elements | | | | |
| Value tag | Mandatory | | | |
| References to other system Information blocks | | 0 <maxSysIn foBlockcou nt> | | |
| | | | | |
| Scheduling information | Mandatory | | | |
| Private Neighbour List Elements | | | | |
|   CONFIG_MSG_SEQ | Mandatory | | | |
|   SID | Mandatory | | | |
|   NID | Mandatory | | | |
|   UZID_INCL | Mandatory | | | |
|   NUM_UZID | Mandatory | | | |
|   UZID | Conditional | | | NUM_UZID occurrences |
|   UZ_REV | Conditional | | | NUM_UZID occurrences |
|   TEMP_SUB | Conditional | | | NUM_UZID occurrences |

FIG. 19

<System Parameters Message>

| FIELD | CLASS | FIELD | CLASS |
|---|---|---|---|
| PILOT_PN | RRC | REG_DIST | Non-RRC |
| CONFIG_MSG_SEQ | Non-RRC | SRCH_WIN_A | RRC |
| SID | Non-RRC | SRCH_WIN_N | RRC |
| NID | Non-RRC | SRCH_WIN_R | RRC |
| REG_ZONE | Non-RRC | NGHBR_MAX_AGE | RRC |
| TOTAL_ZONES | Non-RRC | PWR_REP_THRESH | RRC |
| ZONE_TIMER | Non-RRC | PWR_REP_FRAMES | RRC |
| MULT_SIDS | Non-RRC | PWR_THRESH_ENABLE | RRC |
| MULT_NIDS | Non-RRC | PWR_PERIOD_ENABLE | RRC |
| BASE_ID | Non-RRC | PWR_REP_DELAY | RRC |
| BASE_CLASS | Non-RRC | RESCAN | Non-RRC |
| PAGE_CHAN | RRC | T_ADD | RRC |
| MAX_SLOT_CYCLE_INDEX | RRC | T_DROP | RRC |
| HOME_REG | Non-RRC | T_COMP | RRC |
| FOR_SID_REG | Non-RRC | T_TDROP | RRC |
| FOR_NID_REG | Non-RRC | EXT_SYS_PARAMETERS | Non-RRC |
| POWER_UP_REG | Non-RRC | EXT_NGHBR_LIST | RRC |
| POWER_DOWN_REG | Non-RRC | GEN_NGHBR_LIST | RRC |
| PARAMETER_REG | Non-RRC | PRNGHBR_LIST | Non-RRC |
| REG_PRD | Non-RRC | USER_ZONE_ID | Non-RRC |
| BASE_LAT | Non-RRC | EXT_GLOBAL_REIDRECT | Non-RRC |
| BAST_LONG | Non-RRC | EXT_CHAN_LIST | RRC |
| GLOBAL_REDIRECT | Non-RRC | | |

RRC : INFORMATION FIELD RELATED TO RADIO RESOURCE

Non-RRC : INFORMATION FIELD UNRELATED TO RADIO RESOURCE

FIG. 20

| Information Element | Presence | Range | IE type and reference | Semantics description |
|---|---|---|---|---|
| Other information elements | | | | |
| Value tag | Mandatory | | | |
| References to other system information blocks | | 0 <maxSysInfoBlockcount> | | |
| | | | | |
| Scheduling information | Mandatory | | | |
| System Parameters Message Elements | | | | |
|   CONFIG_MSG_SEQ | Mandatory | | | |
|   SID | Mandatory | | | |
|   NID | Mandatory | | | |
|   REG_ZONE | Mandatory | | | |
|   TOTAL_ZONES | Mandatory | | | |
|   ZONE_TIMER | Mandatory | | | |
|   MULT_SIDS | Mandatory | | | |
|   MULT_NIDS | Mandatory | | | |
|   BASE_ID | Mandatory | | | |
|   BASE_CLASS | Mandatory | | | |
|   HOME_REG | Mandatory | | | |
|   FOR_SID_REG | Mandatory | | | |
|   FOR_NID_REG | Mandatory | | | |
|   POWER_UP_REG | Mandatory | | | |
|   POWER_DOWN_REG | Mandatory | | | |
|   PARAMETER_REG | Mandatory | | | |
|   REG_PRD | Mandatory | | | |
|   BAST_LAT | Mandatory | | | |
|   BASE_LONG | Mandatory | | | |
|   RESCAN | Mandatory | | | |
|   EXT_SYS_PARAMETER* | Mandatory | | | |
|   GLOBAL_REDIRECT | Mandatory | | | |
|   PRI_NGHBR_LIST | Mandatory | | | |
|   USER_ZONE_ID | Mandatory | | | |

FIG. 22

| Extended Global Service Redirection Message |||||
|---|---|---|---|
| FIELD | CLASS | FIELD | CLASS |
| PILOT_PN | RRC | RECORD_LEN | Non-RRC |
| CONFIG_MSG_SEQ | Non-RRC | TYPE-SPECIFIC FIEDS | Non-RRC |
| REDIRECT_ACCOLC | Non-RRC | EXPECTED_SID | Non-RRC |
| RETURN_IF_FAIL | Non-RRC | EXPECTED_NID | Non-RRC |
| DELETE_TMSI | Non-RRC | BAND_CLASS | RRC |
| REDIRECT_P_REV_INCL | Non-RRC | NUM_CHANS | RRC |
| EXCL_P_REV_IND | Non-RRC | CDMA_CHAN | RRC |
| REDIRECT_P_MIN | Non-RRC | IGNORE_CDMA | Non-RRC |
| REDIRECT_P_MAX | Non-RRC | SYS_ORDERING | Non-RRC |
| RECORED_TYPE | Non-RRC | MAS_REDIRECT_DELAY | Non-RRC |

RRC : INFORMATION FIELD RELATED TO RADIO RESOURCE

Non-RRC : INFORMATION FIELD UNRELATED TO RADIO RESOURCE

FIG. 23

| Information Element | Presence | Range | IE type and reference | Semantics description |
|---|---|---|---|---|
| Other Information elements | | | | |
| Value tag | M | | | |
| References to other system information blocks | | 0 .. <maxSysInfoBlockcount> | | |
| | | | | |
| Scheduling information | M | | | |
| Extended Global Service Redirection Elements | | | | |
| CONFIG_MSG_SEQ | M | | | |
| REDIRECT_ACCOLC | M | | | |
| RETURN_IF_FAIL | M | | | |
| DELETE_TMSI | M | | | |
| REDIRECT_P_REV_INCL | M | | | |
| EXCL_P_REV_INC | M | | | |
| REDIRECT_P_MIN | M | | | |
| REDIRECT_P_MAX | M | | | |
| RECORD_TYPE | M | | | |
| RECORE_LEN | M | | | |
| TYPE-SPECIFIC FIELDS | M | | | |
| EXPECTED_SID | C | | | RECORD_TYPE occurrences |
| EXPECTED_NID | C | | | RECORD_TYPE occurrences |
| IGNORE_CDMA | C | | | RECORD_TYPE occurrences |
| SYS_ORDERING | C | | | RECORD_TYPE occurrences |
| MAX_REDIRECT_DELAY | C | | | RECORD_TYPE occurrences |

M = Mandatory   C = Conditional

FIG. 25

| Extended System Parameters Message |||||
|---|---|---|---|
| FIELD | CLASS | FIELD | CLASS |
| PILOT_PN | RRC | PACKET_ZONE_ID | Non-RRC |
| CONFIG_MSG_SEQ | Non-RRC | MAX_MUN_ALT_SO | Non-RRC |
| DELETE_FOR_TMSI | Non-RRC | RESELECT_INCLUDED | RRC |
| USE_TMSI | Non-RRC | EC_THRESH | RRC |
| PREF_MSID_TYPE | Non-RRC | EC_IO_THRESH | RRC |
| MCC | Non-RRC | PILOT_REPORT | RRC |
| IMSI_11_12 | Non-RRC | NGHBR_SET_ENTRY_INFO | RRC |
| TMSI_ZONE_LEN | Non-RRC | ACC_ENT_HO_ORDER | RRC |
| TMSI_ZONE | Non-RRC | NGHBR_SET_ACCESS_INFO | RRC |
| BCAST_INDEX | RRC | ACCESS_HO | RRC |
| IMSI_T_SUPPORTED | Non-RRC | ACCESS_HO_MSG_RSP | RRC |
| P_REV | Non-RRC | ACCESS_PROBE_HO | RRC |
| MIN_P_REV | Non-RRC | ACC_HO_LIST_UPD | RRC |
| SOFT_SLOPE | RRC | ACC_PREVE_HO_OTHER_MSG | RRC |
| ADD_INTERCEPT | RRC | MAX_NUM_PROBE_HO | RRC |
| DROP_INTERCEPT | RRC | NGHBR_SET_SIZE | RRC |

RRC : INFORMATION FIELD RELATED TO RADIO RESOURCE

Non-RRC : INFORMATION FIELD UNRELATED TO RADIO RESOURCE

FIG. 26

| Information Element | Presence | Range | IE type and reference | Semantics description |
|---|---|---|---|---|
| Other information elements | | | | |
| Value tag | Mandatory | | | |
| References to other system information blocks | | 0 .. <maxSysInfoBlockcount> | | |
| | | | | |
| Scheduling information | Mandatory | | | |
| Extended System Parameters Message Elements | | | | |
|    CONFIG_MSG_SEQ | Mandatory | | | |
|    DELTE_FOR_TMSI | Mandatory | | | |
|    USE_TMSI | Mandatory | | | |
|    PREF_MSID_TYPE | Mandatory | | | |
|    MCC | Mandatory | | | |
|    IMSI_11_12 | Mandatory | | | |
|    TMSI_ZONE_LEN | Mandatory | | | |
|    TMSI_ZONE | Mandatory | | | |
|    IMSI_T_SUPPORTED | Mandatory | | | |
|    P_REV | Mandatory | | | |
|    MIN_P_REV | Mandatory | | | |
|    PACKET_ZONE_ID | Mandatory | | | |
|    MAX_NUM_ALT_SO | Mandatory | | | |

FIG. 28

| Global Service Redirection Message ||||
|---|---|---|---|
| FIELD | CLASS | FIELD | CLASS |
| CONFIG_MSG_SEQ | Non-RRC | EXPECTED_SID | Non-RRC |
| REDIREC_ACCOLC | Non-RRC | EXPETED_NID | Non-RRC |
| RETURN_IF_FAIL | Non-RRC | BAND_CLASS | RRC |
| DELTE_TMSI | Non-RRC | NUM_CHANS | RRC |
| EXCL_P_REV_MS | Non-RRC | CDMA_CHAN | RRC |
| RECORD_TYPE | Non-RRC | IGNORE_CDMA | Non-RRC |
| RECORD_LEN | Non-RRC | SYS_ORDERING | Non-RRC |
| TYPE-SPECIFIC FIELDS | Non-RRC | MAX_REDIRECT_DELAY | Non-RRC |

RRC : INFORMATION FIELD RELATED TO RADIO RESOURCE

Non-RRC : INFORMATION FIELD UNRELATED TO RADIO RESOURCE

FIG. 29

| Information Element | Presence | Range | IE type and reference | Semantics description |
|---|---|---|---|---|
| Other Information elements | | | | |
| Value tag | Mandatory | | | |
| References to other system information blocks | | 0 <maxSysInfoBlockcount> | | |
| | | | | |
| | | | | |
| Scheduling information | Mandatory | | | |
| Global Service Redirection Elements | | | | |
|    CONFIG_MSG_SEQ | Mandatory | | | |
|    REDIRECT_ACCOLC | Mandatory | | | |
|    RETURN_IF_FAIL | Mandatory | | | |
|    DELETE_TMSI | Mandatory | | | |
|    EXCL_P_REV_MS | Mandatory | | | |
|    RECORD_TYPE | Mandatory | | | |
|    RECORE_LEN | Mandatory | | | |
|    TYPE-SPECIFIC FIELDS | Mandatory | | | |
|    EXPECTED_SID | Conditional | | | RECORD_TYPE occurrences |
|    EXPECTED_NID | Conditional | | | RECORD_TYPE occurrences |
|    IGNORE_CDMA | Conditional | | | RECORD_TYPE occurrences |
|    SYS_ORDERING | Conditional | | | RECORD_TYPE occurrences |
|    MAX_REDIRECT_DELAY | Conditional | | | RECORD_TYPE occurrences |

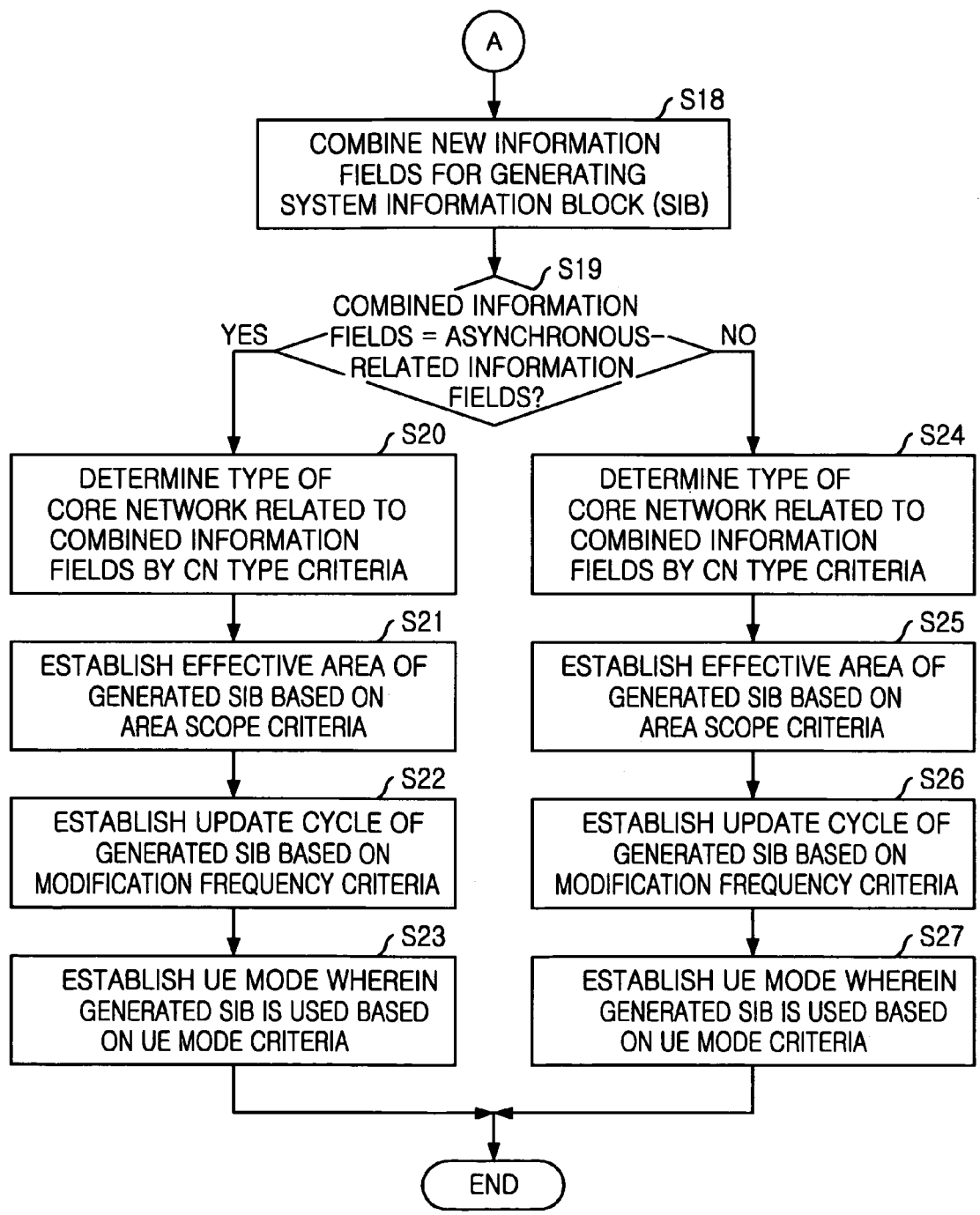

METHOD FOR PROCESSING SYNCHRONOUS MESSAGE IN ASYNCHRONOUS MOBILE COMMUNICATION SYSTEM

FIELD OF THE INVENTION

This invention relates to a method for processing a synchronous message in an asynchronous mobile communication system; and, more particularly, to a method for processing a synchronous message in an asynchronous mobile communication system when a synchronous core network is interlocked with an asynchronous radio network of the asynchronous mobile communication system.

DESCRIPTION OF THE PRIOR ART

In a conventional asynchronous mobile communication system, an asynchronous mobile station is connected to an asynchronous radio (for example, a universal mobile telecommunication system (UMTS) terrestrial radio access (UTRAN)), and a global system for mobile communications-mobile application part (GSM-MAP) network is connected to a core network.

FIG. 1 shows core network interface architectures of the conventional synchronous/asynchronous mobile communication system as mentioned above.

FIG. 1A shows the core network interface architecture of the conventional synchronous mobile communication system. In this drawing, the reference numeral 11 denotes a synchronous mobile station, 12 denotes a synchronous radio network (i.e., a code division multiple access-2000 (CDMA-2000) radio network) which performs a data interfacing operation with the synchronous mobile station 11 and includes a synchronous base transceiver station/base station controller (BTS/BSC), and 13 denotes a synchronous core network which is connected to the synchronous radio network 12 and includes a synchronous mobile services switching center (MSC).

In the above core network interface architecture of the conventional synchronous mobile communication system, the synchronous mobile station 11 can be connected to only the synchronous radio network 12 as well known to one skilled in the art, which is in turn connected to the synchronous core network 13, thereby allowing the synchronous mobile station 11 to be interfaced with only the synchronous core network 13.

FIG. 1B shows the core network interface architecture of the conventional asynchronous mobile communication system. In this drawing, the reference numeral 21 denotes an asynchronous mobile station, 22 denotes an asynchronous radio network (i.e., a UTRAN) which includes a Node B, which is similar to the base transceiver station (BTS), and a radio network controller (RNC), and 23 denotes an asynchronous core network which includes an asynchronous mobile services switching center (MSC) connected to the UTRAN 22.

In the above core network interface architecture of the conventional asynchronous mobile communication system, the asynchronous mobile station 21 is connected to the asynchronous radio network 22 (i.e., UTRAN) which is in turn connected to the asynchronous core network 23, thereby allowing the asynchronous mobile station 21 to perform a data interfacing operation with the asynchronous core network 23.

FIG. 2 shows layered protocol structures of the conventional synchronous/asynchronous mobile communication system as mentioned above.

FIG. 2A shows the layered protocol structure of the conventional synchronous mobile communication system. In this drawing, the reference numeral 30 denotes a synchronous mobile station, 40 a synchronous radio network and 50 a synchronous core network connected to the synchronous radio network 40.

The synchronous mobile station 30 comprises a layer 3 31, a layer 2 35 and a layer 1 36. The layer 3 31 includes a synchronous call control (CC) entity 32 for management of a call and a synchronous mobility management (MM) entity 33 for management of a mobility.

The layer 3 31 is a network layer which includes following sub layers, a synchronous radio resource (RR) sub layer, a synchronous call control (CC) entity 32 and a mobility management (MM) entity 33. In synchronous system, the synchronous RR sub layer is not apparently separated from the others in the layer 3 31.

The RR sub layer offers data transfer services on primitive to a lower layer (RLC sub layer) and handles a control plane signaling of the layer 3 31 between a mobile station (MS) and a synchronous radio network. The RR sub layer manages a radio resource. Also, the RR sub layer assigns/reconfigures/releases the radio resource to UE/UTRAN.

The CC entity handles a call control signaling of layer 3 between the MSs and the synchronous radio network.

The MM entity handles a mobility management signaling of layer 3 between the MSs and the synchronous radio network.

The layers 3 to 1 31, 35 and 36 in the synchronous mobile station 30 communicate with corresponding layers 41, 45 and 46 in the synchronous radio network 40.

The synchronous radio network 40 comprises a layer 3 41, a layer 2 45 and a layer 1 46. The layers 3 to 1 in the synchronous radio network 40 correspond respectively to those in the synchronous mobile station 30.

The layers 3 to 1 41, 45 and 46 in the synchronous radio network 40 communicate with corresponding layers 31, 35, 36, 51, 55 and 56 in the synchronous mobile station and the synchronous core network 50.

The synchronous core network 50 comprises a layer 3 51, a layer 2 55 and a layer 1 56. The layers 3 to 1 in the synchronous radio network 50 correspond respectively to those in the synchronous mobile station 30.

The layers 3 to 1 51, 55 and 56 in the synchronous core network 50 communicate with corresponding layers 41, 45 and 46 in the synchronous radio network 40.

In the conventional synchronous mobile station and radio network as the layered protocol structure, the synchronous mobile station 30 receives a Sync channel message from the synchronous radio network 40 over a Sync channel and acquires information necessary to its connection to the synchronous core network 50, including information related to the synchronous core network 50 and information about the synchronous radio network 40, from the received Sync channel message.

In other words, for interfacing with the synchronous ANSI-41 network via the synchronous radio network, the synchronous mobile station acquires system information (i.e., information related to the radio network and core network) through a system determination sub-state, a pilot channel acquisition sub-state, a Sync channel acquisition sub-state and a synchronization sub-state after it is powered on.

FIG. 5 shows a procedure of state transitions of a synchronous mobile station in the conventional synchronous mobile communication system. FIG. 2B is shows the layered protocol structure of the conventional asynchronous mobile communication system. In this drawing, the reference numeral 60 denotes an asynchronous mobile station, 70 a UTRAN and 80 an asynchronous core network.

The asynchronous mobile station 60 comprises a layer 3 61, a layer 2 65 and a layer 1 66. In particular, the layer 3 61 includes a non-access stratum (NAS) part and an access stratum (AS) part. The NAS part includes an asynchronous call control (CC) part 62 for management of a call and an asynchronous mobility management (MM) part 63 for management of a mobility. The AS part includes an asynchronous radio resource control (RRC) part 64. In the asynchronous system, the asynchronous RRC sub layer is apparently separated from the NAS part. Functions of the asynchronous RRC sub layer are the same as those of the synchronous RR sub layer.

The UTRAN 70 comprises a layer 3 71, a layer 2 73 and a layer 1 74. The layer 3 71 of the UTRAN 70 has no NAS part having asynchronous CC part and asynchronous MM part. The layers 3 to 1 of the UTRAN 70 are connected and correspond respectively to those in the asynchronous mobile station 60 and those in the asynchronous core network 80. However, since the UTRAN 70 does not have the NAS part, i.e., the asynchronous CC part and the asynchronous MM part, the NAS parts of the asynchronous mobile station 60 and the asynchronous core network 80 are not coupled to each other through the UTRAN 70.

The asynchronous core network 80 comprises a layer 3 having a NAS part 81 connected to that of the asynchronous mobile station 60 and a AS part, a layer 2 85 and a layer 1 86 connected respectively to those in the UTRAN 70. The NAS part comprises an asynchronous CC part 82 for management of a call and an asynchronous MM part 83 for management of a mobility.

Functions of the layer 3 to 1 of the asynchronous system are similar with those of the synchronous system except for an operating type. Therefore, detailed description of the layer 3 to 1 will be skipped.

The more detailed descriptions about layered protocol structures are well taught in $3^{rd}$ Generation Partnership Project (3GPP), Technical Specification Group (TSG) —Radio Access Network (RAN): 3G TS25.301 (Radio Interface Protocol Architecture), 3G TS25.302 (Services provided by the physical layer), 3G TS25.321 (MAC Protocol Specification), 3G TS25.322 (RLC Protocol Specification) and 3G TS25.331 (RRC Protocol Specification) in detail.

In the conventional asynchronous mobile station and radio network having the layered protocol structure, the asynchronous mobile station 60 receives a system information message from the UTRAN 70 over a broadcast control channel (BCCH) and acquires information necessary to its connection to the asynchronous core network 80, including information related to the asynchronous core network 80 and information about the UTRAN 70, from the received system information message.

In the next-generation mobile telecommunication system such as the IMT-2000 system, either the GSM-MAP network used in the above conventional asynchronous mobile communication system or the ANSI-41 network used in the above conventional synchronous mobile communication system should be employed as a core network in order to perform an international roaming in a synchronous or asynchronous mobile communication system of an IMT-2000 system.

According to network deployment scenarios, the asynchronous IMT-2000 system can have the following two inter face architectures; first: asynchronous mobile station—asynchronous radio network—synchronous ANSI-41 network, second: asynchronous mobile station—asynchronous radio network—asynchronous GSM-MAP network.

FIG. 3 shows core network interface architectures of the next-generation mobile communication system such as the asynchronous IMT-2000 system.

FIG. 3A shows an asynchronous GSM-MAP core network interface architecture of a hybrid type asynchronous radio network. In this drawing, the reference numeral 210 denotes a hybrid type asynchronous mobile station, 220 denotes a hybrid type UTRAN which is a hybrid type asynchronous radio network, and 230 denotes an asynchronous core network which is connected to the hybrid type UTRAN 220 and includes an asynchronous MSC.

FIG. 3B shows a synchronous ANSI-41 core network interface architecture of the hybrid type asynchronous radio network. In this drawing, the reference numeral 210 denotes a hybrid type asynchronous mobile station, 220 denotes a hybrid type UTRAN which is a hybrid type asynchronous radio network, and 240 denotes a synchronous core network which is connected to the hybrid type UTRAN 220 and includes a synchronous MSC.

In order to be operable adaptively to the above two interface architectures, the hybrid type asynchronous mobile stations in the next-generation asynchronous mobile communication system has both asynchronous CC and MM protocol entities serving for the GSM-MAP core network and synchronous CC and MM protocol entities serving for the ANSI-41 core network at the layer 3 in the protocol stack structure, which is a different from each of the conventional asynchronous mobile stations.

FIG. 4 shows layered protocol structures of the next-generation asynchronous mobile communication system.

FIG. 4A shows layered protocol structures of a hybrid type asynchronous mobile station, a hybrid type asynchronous radio network and a synchronous ANSI-41 core network. In this drawing, the reference numeral 210 denotes a hybrid type asynchronous mobile station, 220 denotes a hybrid type UTRAN which is a hybrid type asynchronous radio network, and 230 denotes an ANSI-41 core network connected to the hybrid type UTRAN 220.

The hybrid type asynchronous mobile station 210 comprises a layer 3 211, a layer 2 217 and a layer 1 218. The layer 1 includes a synchronous CC part 212, a synchronous MM part 213, an asynchronous CC part 214, an asynchronous MM part 215 and asynchronous RRC part 216 and selectively activates a synchronous CC/MM protocol or an asynchronous CC/MM protocol.

For example, if the hybrid type asynchronous mobile station 210 is currently connected to the ANSI-41 core network 230, the layer 3 therein activates a protocol between the synchronous CC part 212 and synchronous MM part 213 to perform a message interfacing operation with the ANSI-41 core network 230.

FIG. 4B shows layered protocol structures of a hybrid type asynchronous mobile station, a hybrid type asynchronous radio network and an asynchronous GSM-MAP core network. In this drawing, the reference numeral 210 denotes a hybrid type asynchronous mobile station, 220 denotes hybrid type a UTRAN which is a hybrid type asynchronous radio network, and 240 denotes an asynchronous GSM-MAP core network connected to the hybrid type UTRAN 220.

The hybrid type asynchronous mobile station 210 comprises a layer 3 211 having a NAS part and an AS part, a layer 2 217 and a layer 1 218. The NAS part includes a synchronous CC part 212, a synchronous MM part 213, an asynchronous CC part 214 and an asynchronous MM part 215 and selectively activates a synchronous CC/MM protocol or an asynchronous CC/MM protocol. The AS part includes an asynchronous RRC part 216.

The hybrid type asynchronous radio network 220 comprises a layer 3 221 having a NAS part and an AS part, a layer 2 225 and a layer 1 226, which activate their protocols corresponding respectively to those in the hybrid type asynchronous mobile station 210 and those in the GSM-MAP core network 240 to transmit and receive messages.

The GSM-MAP core network 240 comprises a layer 3 241 having a NAS part and an AS part, a layer 2 245 and a layer 1 246. The NAS part includes an asynchronous CC part 242 and an asynchronous MM part 243. The AS part includes an asynchronous RRC part 244.

For example, if the hybrid type asynchronous mobile station 210 is currently connected to the GSM-MAP core network 240, the NAS part therein activates protocols of the asynchronous CC part 214 and asynchronous MM part 215 to perform a message interfacing operation with the GSM-MAP core network 240.

The layers 3 to 1 of the hybrid type asynchronous radio network 220 are connected and correspond respectively to those in the hybrid type synchronous mobile station 210 and those in the asynchronous core network 240. However, the NAS parts of the hybrid type asynchronous mobile station 210 and the asynchronous core network 240 are not coupled to each other through the hybrid type asynchronous mobile station 220.

At the synchronous mobile station in the synchronous mobile communication system, an overhead message is received via a paging channel and types of the overhead message are as follows:

1) system parameters message;
2) access parameters message;
3) neighbor list message;
4) CDMA channel list message;
5) extended system parameters message;
6) extended neighbor list message;
7) global service redirection message;
8) general neighbor list message;
9) user zone identification message;
10) private neighbor list message;
11) extended global service redirection message; and
12) extended CDMA channel list message.

The above overhead messages are transmitted to the synchronous mobile station periodically and provide following information:

a) detailed information of a system (a location of the system, an identifier of the system, an operation frequency of the system and handoff operation information);
b) detailed information of neighboring systems;
c) channel information used in a current system;
d) information about a registration area of the synchronous mobile station;
e) information about a user zone for a tiered service; and
f) information necessary for the synchronous mobile station to access the system.

The above information from the overhead message that is transmitted to the synchronous mobile station, is stored at the CC and MM protocol entities. The stored information is used as a reference when the synchronous mobile station transmits a message related to a call control and a mobility management to the system.

The messages among the above overhead messages which should be essentially transmitted to and then stored in the CC/MM protocol entities of the synchronous mobile station are as follows:

1) user zone identification message;
2) private neighbor list message;
3) system parameter message;
4) extended system parameters message;
5) global service redirection message; and
6) extended global service redirection message.

The user zone identification message among the above overhead messages is used for the tiered service. The tiered service means that a service requested by the synchronous mobile station or a special service is provided to the synchronous mobile station, based on a location of the synchronous mobile station. A concept of the user zone is necessary for the tiered service.

The user zone identification message provides following information related to the user zone:

i) a number of the user zones covered by the system;
ii) IDs of each user zone covered by the system;
iii) a user zone update revision number held by the system; and
iv) a parameter used for getting out of the user zone.

Information contained in the user zone identification message is shown in FIG. 6.

The private neighbor list message among the overhead messages provides the tiered service to the neighbor list of the current system and information about neighboring systems which the synchronous mobile station does not register in the user zone but affords to provide the tiered service.

The private neighbor list message provides following information:

i) a number of the neighboring systems that the tiered service is provided to;
ii) system identification (SID) information and network identification (NID) information of the neighboring systems that the tiered service is provided to;
iii) band class information and frequency information of the neighboring systems that the tiered service is provided to; and
iv) user zone information of the neighboring systems that the tiered service is provided to.

The synchronous mobile station can be provided with the tiered service by performing a registering from the user zone of the current system to the user zone of the neighbor system, based on the private neighbor list message.

Information elements contained in the private neighbor list message are shown in FIG. 7.

The system parameters message among the above overhead messages provides to the synchronous mobile station detailed information, that is, information about the NID and the SID of the system, an antenna angle of the system, a system identifier, an operation frequency of the system and a handoff operation or the like. Also, the system parameters message informs whether an extended system parameters message, an extended neighbor list message, a neighbor list message, a user zone identification message, an extended CDMA channel list message and an extended global service redirection message among the overhead messages are transmitted or not.

Information elements contained in the system parameters message are shown in FIG. 8.

The extended global service redirection message among the above overhead message provides information of another system having an operation mode and the band class not equal to those of the current system, to the synchronous mobile station, so that the synchronous mobile station can select another system and then be operated.

The extended global service redirection message provides following information:
i) a configuration message sequence number related to a global service redirection;
ii) access overload class information used in a new system;
iii) the NID, the SID, the band class and the CDMA channel information of the new system;
iv) a maximum protocol revision number of the synchronous mobile station necessary for redirecting the service based on the extended global service redirection message; and
v) a minimum protocol revision number of the synchronous mobile station necessary for redirecting the service based on the extended global service redirection message.

Information elements contained in the extended global service redirection message are shown in FIG. 9.

The global service redirection message among the above overhead messages provides information of another system having an operation mode and the band class not equal to those of the current system, to the synchronous mobile station, so that the synchronous mobile station can select another system and then be operated.

The global service redirection message provides following information:
i) a configuration message sequence number related to a global service redirection;
ii) access overload class information used in a new system;
iii) service redirection type information; and
iv) the NID, the SID, the band class and the CDMA channel information of the new system.

Information elements contained in the global service redirection message are shown in FIG. 11.

A utility of the above global service redirection message is different from that of the extended global service redirection message. The global service redirection message provides a service of the service redirection to the synchronous mobile station having a protocol revision number lower than six. On the contrary, the extended global service redirection message provides a service of the service redirection to the synchronous mobile station having the protocol revision number equal to or higher than 6.

The extended system parameters message among the above overhead message provides identification information by which the synchronous mobile station is discriminated in the system, based on an IMSI or a TMSI.

The extended system parameters message provides following information:
i) a mobile station identification type;
ii) the TMSI and the IMSI information that are used by the mobile station;
iii) protocol revision information of the CC and the MM protocol entities between the mobile station and the system;
iv) a packet data service zone identifier used upon a transmission of the packet data;
v) additive service information that can be requested by the mobile station; and
vi) information related to an access handoff.

Information elements contained in the extended system parameters message are shown in FIG. 10.

If there is not provided the extended system parameters message, the system cannot identify the mobile station and provide a service requested by the mobile station.

A difference between the extended system parameters message and the system parameters message is as follows.

The system parameters message serves to control detailed information about the system, that is, information about a location of the system, an operation frequency of the system, a system identifier, a handoff operation or the like and the overhead message. On the contrary, the extended system parameters message serves to provide information by which the mobile station communicating with the system is discriminated and information about types of service which the system can provide additionally, so that the CC and the MM protocol entities can perform a call control and a mobility management well, respectively.

However, because there are not the messages described above, that is, the user zone identification message, the private neighbor list message, the system parameters message, the extended system parameters message, the global service redirection message and the extended global service redirection message in the asynchronous mobile communication system, there is caused a problem that the synchronous CC and MM protocol entities of the asynchronous mobile station can't perform normal functions of the call control, the mobility management or the like.

The asynchronous radio network transmits a system information message to the asynchronous mobile station, and to thereby provide information that is used at the CC and MM protocol entities of the asynchronous mobile station and other information. Information contained in the system information message is as follows:
1) information related to the core network;
2) information related to a cell selection and a cell reselection;
3) information related to an asynchronous radio resource; and
4) information related to an asynchronous radio link measurement.

The above information is included in a system information block and transmitted to the asynchronous mobile station. The system information block (SIB) is generated, based on criteria of an area scope, a modification frequency and a user equipment (UE) mode.

After receiving the system information message including the SIB generated by using the criteria at the asynchronous mobile station, a plurality of information related to the radio resource is stored and used at a radio resource control (RRC) protocol entity of the asynchronous mobile station and other information is stored and used at the CC and MM protocol entities of the asynchronous mobile station, so that the asynchronous mobile station can perform functions of the call control and the mobility management well.

In case the asynchronous radio network is interlocked with the synchronous ANSI-41 core network, an asynchronous radio resource is used as a resource and an asynchronous message is exchanged between the asynchronous radio network and the asynchronous mobile station. On the other hand, the synchronous CC and MM protocol entities of the asynchronous mobile station are operated.

In this case, information fields related to a type of the core network among synchronous messages should be received by the asynchronous mobile station so that the synchronous CC and MM protocol entities of the asynchronous mobile station can be operated normally.

To generate the SIB including the information fields, the three criteria of the area scope, the modification frequency and the UE mode described above need to be used. However, this 3 criteria are taken into consideration just for the case where the SIB is generated in the asynchronous mobile communication system, when the asynchronous radio network is interlocked with the asynchronous GSM-MAP core network.

Accordingly, there is caused a problem that it is impossible for the asynchronous mobile station to interlocked with the synchronous core network, because the asynchronous radio network doesn't have information related to the type of the core network upon interlocking with the synchronous ANSI-41 core network.

SUMMARY OF THE INVENTION

It is an object of the present invention to provide a method for processing a synchronous message in an asynchronous mobile communication system including an asynchronous mobile station and an asynchronous radio network, in case an asynchronous core network or a synchronous core network is interlocked with the asynchronous radio network.

It is another object of the present invention to provide a method for generating a system information block in an asynchronous mobile communication system including an asynchronous mobile station and an asynchronous radio network, in case an asynchronous core network or a synchronous core network is interlocked with the asynchronous radio network.

In accordance with an aspect of the present invention, there is provided a method for processing a synchronous message in an asynchronous mobile communication system including an asynchronous mobile station and an asynchronous radio network, the method comprising the steps of: a) when a synchronous core network is interlocked with the asynchronous radio network, generating a system information block, based on a header information provided from the synchronous core network; b) formatting the generated information block into a system information message; and c) transmitting the system information message to the asynchronous mobile station via a channel.

In accordance with another aspect of the present invention, there is provided a method for generating a system information block in an asynchronous mobile communication system including an asynchronous mobile station and an asynchronous radio network, wherein a core network is interlocked, the method comprising the steps of: determining a type of the core network; combining information fields for generating the system information block; determining the type of the core network related to the combined information fields; and establishing an effective area, an update cycle and a user equipment (UE) mode.

BRIEF DESCRIPTION OF THE DRAWINGS

Other objects and aspects of the invention will become apparent from the following description of the embodiments with reference to the accompanying Drawings, in which:

FIG. 1A is a pictorial representation illustrating a conventional structure of a synchronous mobile communication system interlocking with a synchronous core network;

FIG. 1B is a pictorial representation of conventional structuring of an asynchronous mobile communication system interlocking with an asynchronous core network;

FIG. 2A is a diagram representing protocol structures of each section in the synchronous mobile communication system;

FIG. 3A is a pictorial representation of structure of interlocking with an asynchronous GSM-MAP core network in an asynchronous mobile communication system;

FIG. 3B is a pictorial representation of structure of interlocking with a synchronous ANSI-41 core network in an asynchronous mobile communication system;

FIG. 4A is a schematic diagram representing protocol layers structure in the asynchronous mobile communication system interlocking with a synchronous ANSI-41 core network;

FIG. 5 is a flowchart illustrating state transitions of a synchronous mobile station in the conventional synchronous mobile communication system;

FIG. 7 is a table illustrating a configuration of a system parameters message used in a conventional synchronous mobile communication system;

FIG. 8 is a table illustrating a configuration of a system parameters message used in a conventional synchronous mobile communication system;

FIG. 9 is a table illustrating a configuration of a system parameters message used in a conventional synchronous mobile communication system;

FIG. 10 is a table illustrating a configuration of an extended global service redirection message used in a conventional synchronous mobile communication system;

FIG. 11 is a table illustrating a configuration of a global service redirection message used in a conventional synchronous mobile communication system;

FIG. 12 is a table showing that a user zone identification message is classified into information related to a radio resource and information unrelated to the radio resource in accordance with the present invention;

FIG. 13 is a table illustrating a configuration of a system information block, for example, a user zone identification message, which is formatted in a system information message transmitted to the an asynchronous mobile station via a broad cast control channel (BCCH) in accordance with the present invention;

FIG. 16 is a table showing that a private neighbor list message is classified into information related to a radio resource and information unrelated to the radio resource in accordance with the present invention;

FIG. 17 is a table illustrating a configuration of a system information block, for example, a private neighbor list message, which is formatted in a system information message transmitted to the an asynchronous mobile station via a broad cast control channel (BCCH) in accordance with the present invention;

FIG. 19 is a table showing that a system parameters message is classified into information related to a radio resource and information unrelated to the radio resource in accordance with the present invention;

FIG. 20 is a table illustrating a configuration of a system information block, for example, a system parameters message, which is formatted in a system information message transmitted to the an asynchronous mobile station via a broad cast control channel (BCCH) in accordance with the present invention;

FIG. 22 is a table showing that an extended global service redirection message is classified into information related to a radio resource and information unrelated to the radio resource in accordance with the present invention;

FIG. 23 is a table illustrating a configuration of a system information block, for example, an extended global service redirection message, which is formatted in a system information message transmitted to the an asynchronous mobile station via a broad cast control channel (BCCH) in accordance with the present invention;

FIG. 25 is a table showing that an extended system parameters message is classified into information related to a radio resource and information unrelated to the radio resource in accordance with the present invention;

FIG. 26 is a table illustrating a configuration of a system information block, for example, an extended system parameters message, which is formatted in a system information message transmitted to the an asynchronous mobile station via a broad cast control channel (BCCH) in accordance with the present invention;

FIG. 28 is a table showing that a global service redirection message is classified into information related to a radio resource and information unrelated to the radio resource in accordance with the present invention;

FIG. 29 is a table illustrating a configuration of a system information block, for example, a global service redirection message, which is formatted in a system information message transmitted to the an asynchronous mobile station via a broad cast control channel (BCCH) in accordance with the present invention;

DETAILED DESCRIPTION OF THE PREFERRED EMBODIMENTS

Embodiment 1

Figure 2B:
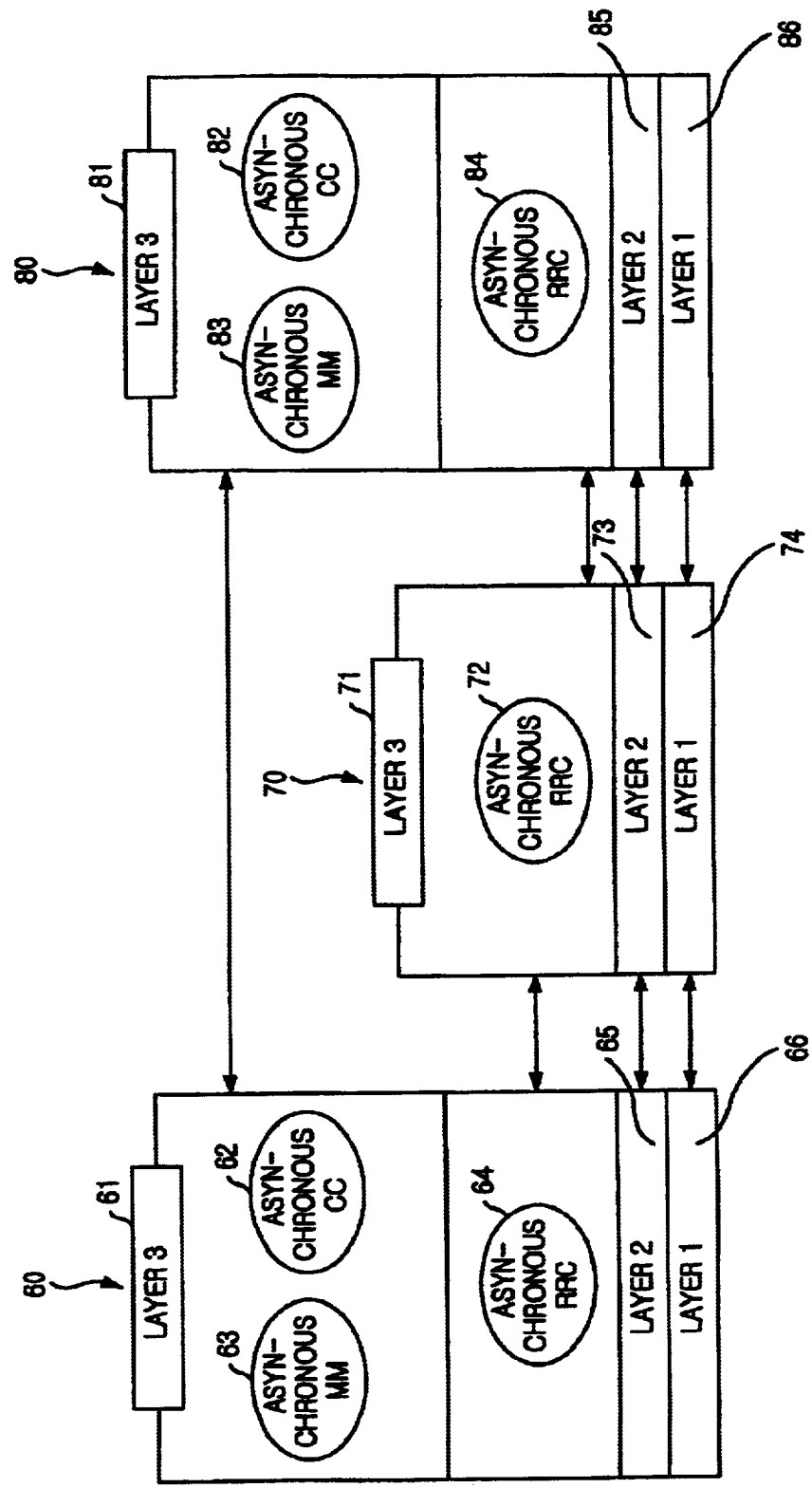
FIG. 2B is a diagram representing protocol structures of each section in the asynchronous mobile communication system.
Figure 4B:
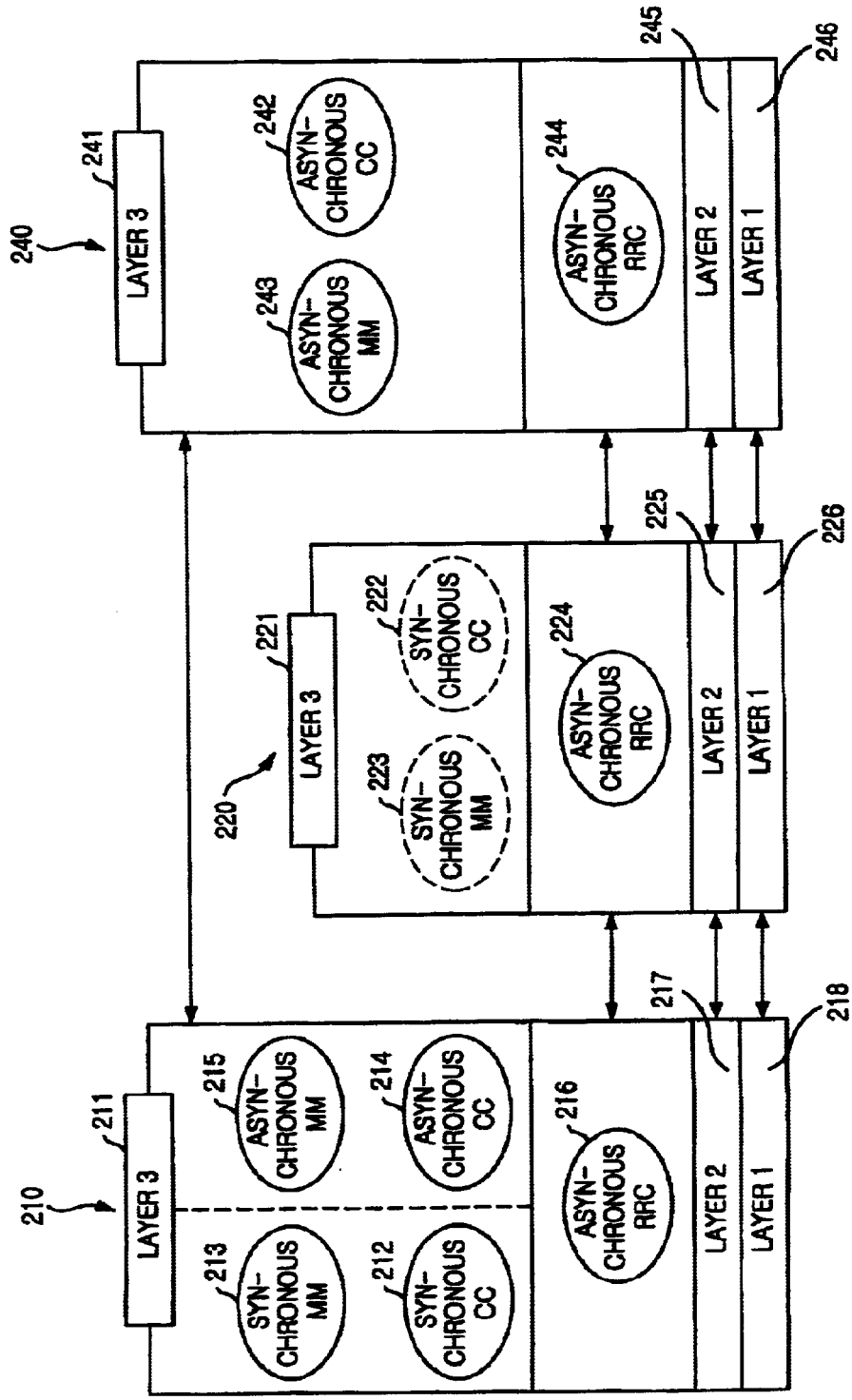
FIG. 4B is a schematic diagram representing protocol layers structure in the asynchronous mobile communication system interlocking with an asynchronous GSM-MAP core network.
Figure 6:
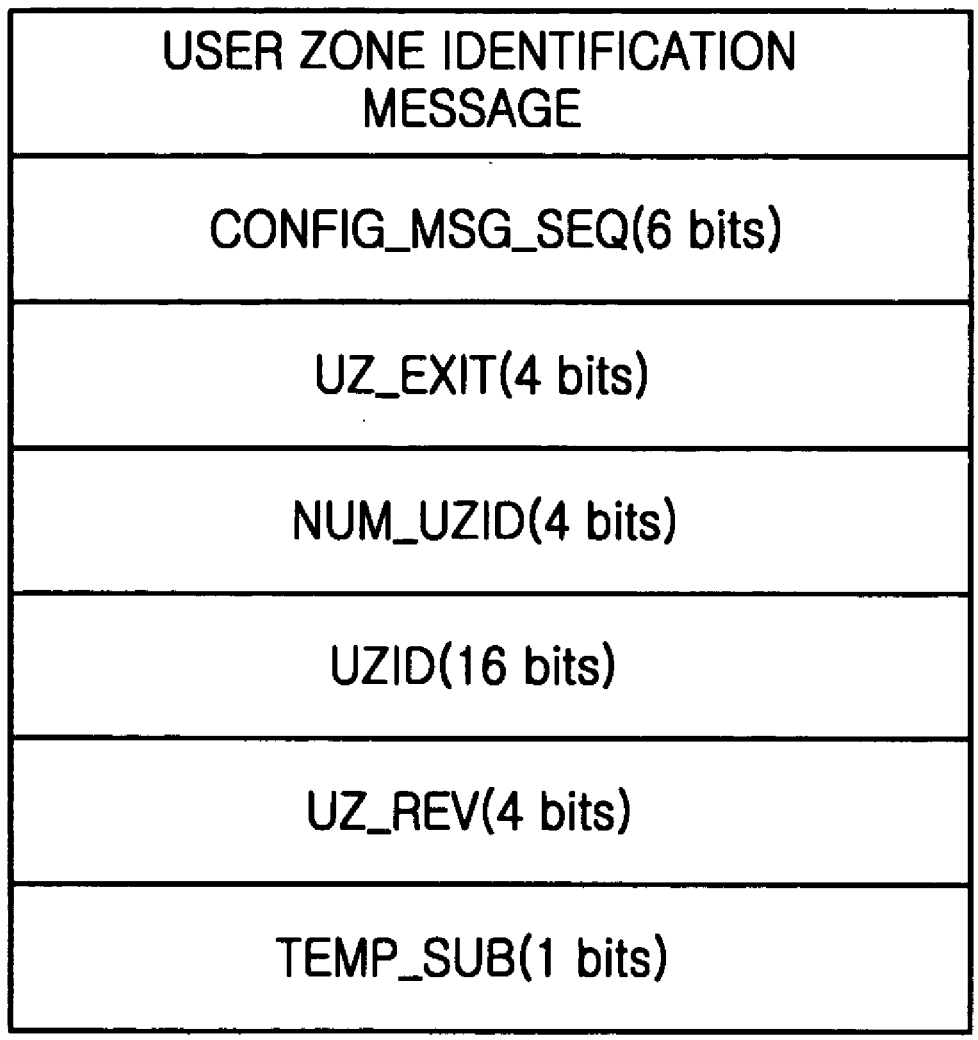
FIG. 6 is a table illustrating a configuration of a user zone identification message used in a conventional synchronous mobile communication system.

As shown in FIG. 4, in case where international mobile telecommunication-2000 (IMT-2000) system has an interlocking structure which includes an asynchronous mobile station, an asynchronous radio network and a synchronous ANSI-41 core network, a synchronous call control (CC) and a synchronous mobility management (MM) protocol entities of an asynchronous mobile station are activated. In this case, information related to a radio resource is represented asynchronous. All messages which are exchanged between the asynchronous mobile station and the asynchronous radio network, are represented asynchronous. On the contrary, information unrelated to the radio resource is represented synchronous for the synchronous call control (CC) and a synchronous mobility management (MM) protocol entities of an asynchronous mobile station.

Referring to FIG. 12, information elements of a user zone identification message are classified into information elements related to the radio resource and information elements unrelated to the radio resource, in order to select and transmit to the asynchronous mobile station, the information elements unrelated to the radio resource from the information elements of a user zone identification message that is included in an overhead message of a synchronous system.

As shown in FIG. 12, information elements corresponding to a NON-RRC are not related to the radio resource, and thus, as shown in FIG. 12, no information elements related to the radio resource are included in the information elements of a user zone identification message.

In accordance with the present invention, referring to FIG. 13, a new type of system information block is represented, in order to transmit to the asynchronous mobile station, the classified information elements unrelated to the radio resource by using a system information message that is transmitted via a broadcast control channel (BCCH).

The new type of system information block is substituted for another system information block that is formatted in a predetermined position of the system information message, and is transmitted to the asynchronous mobile station irrespective of which state the asynchronous mobile station is in, an idle mode or a connected mode.

In FIG. 13, a <maxSysInfoBlockcount> recorded in a Range Bound refers to a maximum number that is a criterion of other system information blocks.

Figure 14:
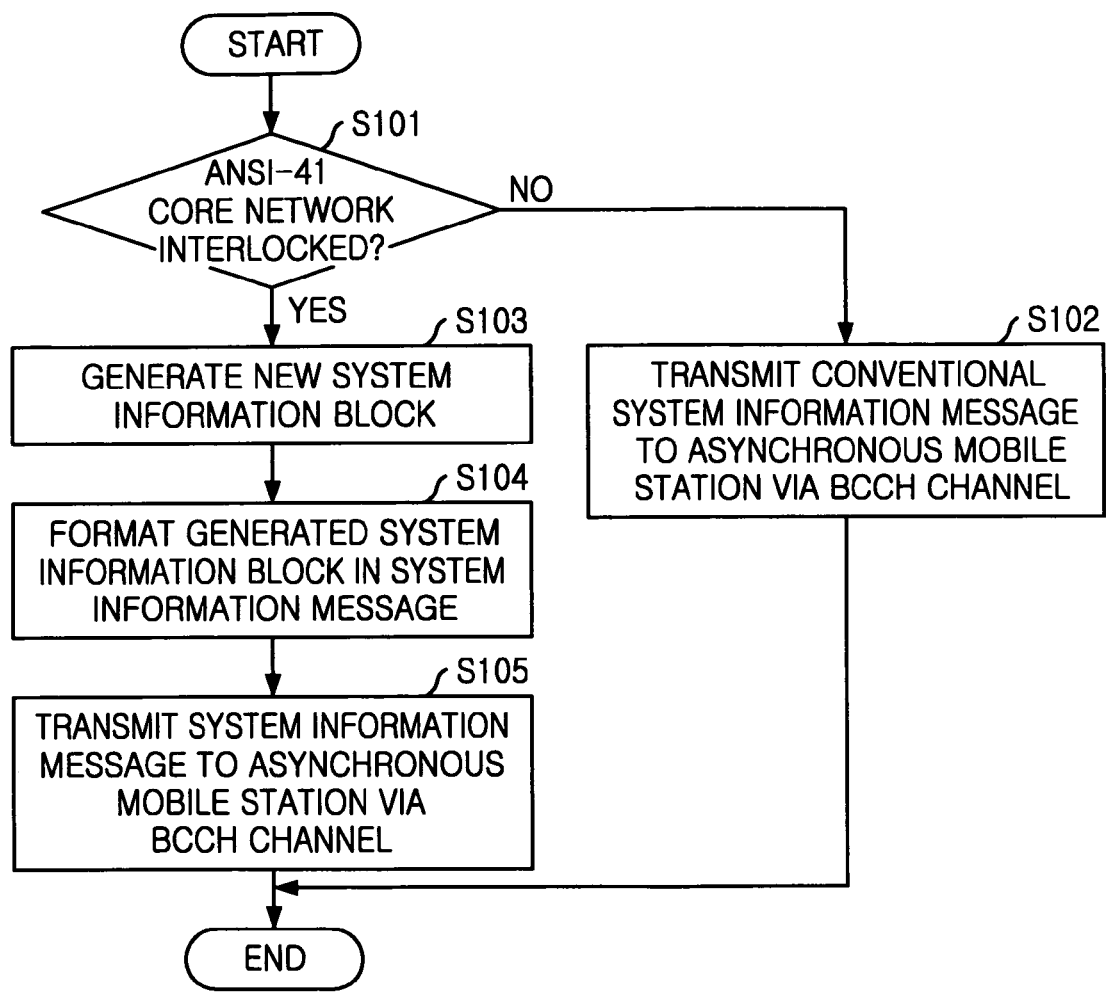
FIG. 14 is a flow chart illustrating a method for processing a synchronous message in an asynchronous mobile communication system including an asynchronous mobile station and an asynchronous radio network, wherein a synchronous core network is interlocked in accordance with the present invention.

In case the synchronous ANSI-41 core network is interlocked with the asynchronous radio network as shown in FIG. 4, the asynchronous radio network transmits a synchronous message to the asynchronous mobile station according to a procedure shown in FIG. 14 in accordance with the present invention for synchronous call control (CC) and a synchronous mobility management (MM) protocol entities of an asynchronous mobile station.

At step S101, an asynchronous radio network determines if a ANSI-41 core network is interlocked, and if not, a logic flow proceeds to step S102 where the asynchronous radio network transmits a system information message to an asynchronous mobile station via a broadcast control channel (BCCH), otherwise the logic flow proceeds to step S103 where the asynchronous radio network generates a new system information block, contents of which are varied with information to be transmitted.

At step S104, the new system information block is formatted in the system information message.

At step S105, the system information message is transmitted to the asynchronous mobile station.

The asynchronous mobile station shown in FIG. 4 receives the system information message transmitted from the asynchronous radio network at the synchronous call control (CC) and mobility management (MM) protocol entities of the asynchronous mobile station, selects out a user zone identification message that is recorded in the new system information block of the system information message and performs an operation corresponding to the selected user zone identification message.

Figure 15:
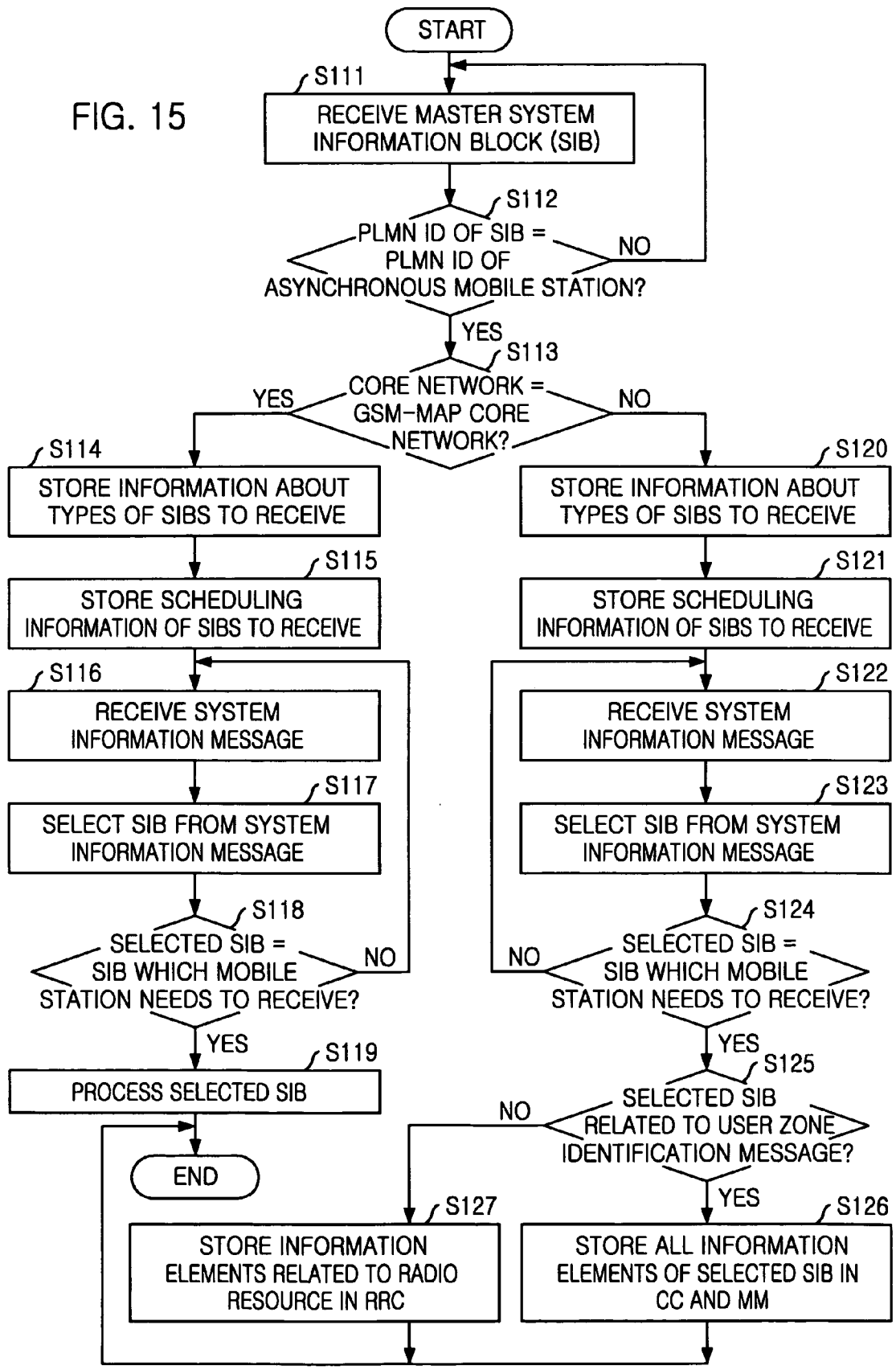
FIG. 15 is a flow chart illustrating a first embodiment of a method for processing a synchronous message at an asynchronous mobile station which receives a system information block containing the synchronous message in accordance with the present invention.

FIG. 15 shows a procedure where an asynchronous mobile station receives and processes a user zone identification message included in an overhead message that is used in a synchronous system, based on a system information message that is used in an asynchronous system.

At step S111, the asynchronous mobile station receives a master system information block transmitted from an asynchronous radio network via a broadcast control channel (BCCH).

At step S112, the asynchronous mobile station determines if a public land mobile network identity (PLMN ID) among information elements that are contained in the master system information block, is equal to a PLMN ID stored in the asynchronous mobile station, and if not, after the master system information block is cleared, the logic flow returns to the step S111, otherwise the logic flow proceeds to step S113.

At step the S113, the asynchronous mobile station determines if a type of a core network is a global system for mobile communications-mobile application part (GSM-MAP), and if not, the logic flow proceeds to step S120, otherwise proceeds to step S114 where information about a type of system information blocks is stored in the asynchronous mobile station that the asynchronous mobile station should cyclically receive via the system information message, based on the master system information block.

At step S115, scheduling information about the system information blocks is stored in the asynchronous mobile station that the asynchronous mobile station should cyclically receive via the system information message, based on the master system information block.

At step S116, the asynchronous mobile station receives the system information message.

At step S117, a system information block is selected from the received system information message.

At step S118, the asynchronous mobile station determines if the selected system information block is equal to a system information block (SIB) that the asynchronous mobile station should receive, and if not, the received system information message is cleared and the logic flow returns to the step S116, otherwise the logic flow proceeds to step S119.

At the step S119, information related to the radio resource is stored in the RRC protocol and information unrelated to the radio resource is stored in the asynchronous CC and MM protocol entities. Then, the asynchronous mobile station awaits a next system information message.

At the step S120, information about a type of system information blocks is stored in the asynchronous mobile station that the asynchronous mobile station should cyclically receive via the system information message, based on the master system information block.

At step S121, scheduling information about the system information blocks is stored in the asynchronous mobile station that the asynchronous mobile station should cyclically receive via the system information message, based on the master system information block.

At step S122, the asynchronous mobile station receives the system information message.

At step S123, a system information block is selected from the received system information message.

At step S124, the asynchronous mobile station determines if the selected system information block is equal to a system information block (SIB) that the asynchronous mobile station should receive, and if not, the received system information message is cleared and the logic flow returns to the step S122, otherwise the logic flow proceeds to step S125.

At the step S125, the asynchronous mobile station determines if the selected system information block is related to a synchronous user zone identification message (UZIM), and if not, the logic flow proceeds to step S127, otherwise proceeds to step S126 where all information elements contained in the selected system information block are stored in the synchronous CC and MM protocol entities. Then, the asynchronous mobile station awaits a next system information message.

At the step S127, information related to the radio resource is stored in the RRC protocol entity. Then, the asynchronous mobile station awaits a next system information message.

Embodiment 2

As shown in FIG. 4, in case an international mobile telecommunication-2000 (IMT-2000) system has an interlocking structure which includes an asynchronous mobile station, an asynchronous radio network and a synchronous ANSI-41 core network, a synchronous call control (CC) and a synchronous mobility management (MM) protocol entities of an asynchronous mobile station are activated. In this case, information related to a radio resource is represented asynchronous. All messages which are exchanged between the asynchronous mobile station and the asynchronous radio network, are represented asynchronous. On the contrary, information unrelated to the radio resource is represented synchronous for the synchronous call control (CC) and a synchronous mobility management (MM) protocol entities of an asynchronous mobile station.

Referring to FIG. 16, information elements of a private neighbor list message are classified into information elements related to the radio resource and information elements unrelated to the radio resource, in order to select and transmit to the asynchronous mobile station, the information elements unrelated to the radio resource from the information elements of the private neighbor list message that is included in an overhead message of a synchronous system.

As shown in FIG. 16, information elements corresponding to a NON-RRC are not related to the radio resource and information elements corresponding to a RRC are related to the radio resource.

In accordance with the present invention, referring to FIG. 17, a new type of system information block is represented, in order to transmit to the asynchronous mobile station, the classified information elements unrelated to the radio resource by using a system information message that is transmitted via a broadcast control channel (BCCH).

The new type of system information block is substituted for another system information block that is formatted in a predetermined position of the system information message, and is transmitted to the asynchronous mobile station irrespective of which state the asynchronous mobile station is in, an idle mode or a connected mode.

In FIG. 17, a <maxSysInfoBlockcount> recorded in a Range Bound refers to a maximum number that is a criterion of other system information blocks.

In case the synchronous ANSI-41 core network is interlocked with the asynchronous radio network as shown in FIG. 4, the asynchronous radio network transmits a synchronous message to the asynchronous mobile station according to a procedure shown in FIG. 14 in accordance with the present invention for the synchronous call control (CC) and a synchronous mobility management (MM) protocol entities of an asynchronous mobile station.

At step S101, an asynchronous radio network determines if a ANSI-41 core network is interlocked, and if not, a logic flow proceeds to step S102 where the asynchronous radio network transmits a system information message to an asynchronous mobile station via a broadcast control channel (BCCH), otherwise the logic flow proceeds to step S103 where the asynchronous radio network generates a new system information block, contents of which are varied with information to be transmitted.

At step S104, the new system information block is formatted in the system information message.

At step S105, the system information message is transmitted to the asynchronous mobile station.

The asynchronous mobile station shown in FIG. 4 receives the system information message transmitted from the asynchronous radio network at the synchronous call control (CC) and mobility management (MM) protocol entities of the asynchronous mobile station, selects out a private neighbor list message that is recorded in the new system information block of the system information message and performs an operation corresponding to the selected private neighbor list message.

Figure 18:
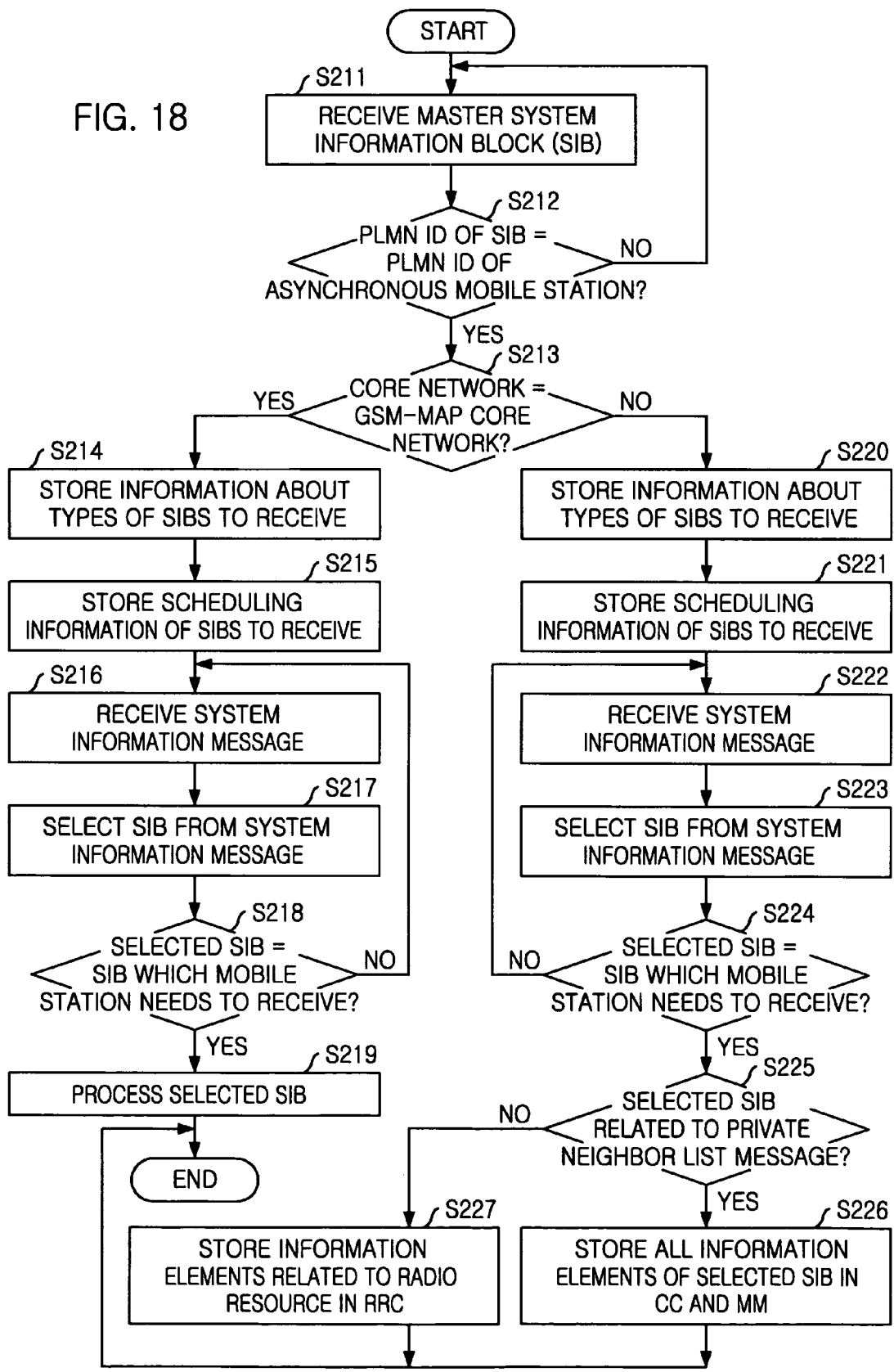
FIG. 18 is a flow chart illustrating a second embodiment of a method for processing a synchronous message at an asynchronous mobile station which receives a system information block containing the synchronous message in accordance with the present invention.

FIG. 18 shows a procedure where an asynchronous mobile station receives and processes a private neighbor list message included in an overhead message that is used in a synchronous system, based on a system information message that is used in an asynchronous system.

At step S211, the asynchronous mobile station receives a master system information block transmitted from an asynchronous radio network via a broadcast control channel (BCCH).

At step S212, the asynchronous mobile station determines if a public land mobile network identity (PLMN ID) among information elements that are contained in the master system information block, is equal to a PLMN ID stored in the asynchronous mobile station, and if not, after the master system information block is cleared, the logic flow returns to the step S211, otherwise the logic flow proceeds to step S213.

At step the S213, the asynchronous mobile station determines if a type of a core network is a global system for mobile communications-mobile application part (GSM-MAP), and if not, the logic flow proceeds to step S220, otherwise proceeds to step S214 where information about a type of system information blocks is stored in the asynchronous mobile station that the asynchronous mobile station should cyclically receive via the system information message, based on the master system information block.

At step S215, scheduling information about the system information blocks is stored in the asynchronous mobile station that the asynchronous mobile station should cyclically receive via the system information message, based on the master system information block.

At step S216, the asynchronous mobile station receives the system information message.

At step S217, a system information block is selected from the received system information message.

At step S218, the asynchronous mobile station determines if the selected system information block is equal to a system information block (SIB) that the asynchronous mobile station should receive, and if not, the received system information message is cleared and the logic flow returns to the step S216, otherwise the logic flow proceeds to step S219.

At the step S219, information related to the radio resource is stored in the RRC protocol and information unrelated to the radio resource is stored in the asynchronous CC and MM protocol entities. Then, the asynchronous mobile station awaits a next system information message.

At the step S220, information about a type of system information blocks is stored in the asynchronous mobile station that the asynchronous mobile station should cyclically receive via the system information message, based on the master system information block.

At step S221, scheduling information about the system information blocks is stored in the asynchronous mobile station that the asynchronous mobile station should cyclically receive via the system information message, based on the master system information block.

At step S222, the asynchronous mobile station receives the system information message.

At step S223, a system information block is selected from the received system information message.

At step S224, the asynchronous mobile station determines if the selected system information block is equal to a system information block (SIB) that the asynchronous mobile station should receive, and if not, the received system information message is cleared and the logic flow returns to the step S222, otherwise the logic flow proceeds to step S225.

At the step S225, the asynchronous mobile station determines if the selected system information block is related to a private neighbor list message, and if not, the logic flow proceeds to step S227, otherwise proceeds to step S226 where all information elements contained in the selected system information block are stored in the synchronous CC and MM protocol entities. Then, the asynchronous mobile station awaits a next system information message.

At the step S227, information related to the radio resource is stored in the RRC protocol entity. Then, the asynchronous mobile station awaits a next system information message.

Embodiment 3

As shown in FIG. 4, in case an international mobile telecommunication-2000 (IMT-2000) system has an interlocking structure which includes an asynchronous mobile station, an asynchronous radio network and a synchronous ANSI-41 core network, a synchronous call control (CC) and a synchronous mobility management (MM) protocol entities of an asynchronous mobile station are activated. In this case, information related to a radio resource is represented asynchronous. All messages which are exchanged between the asynchronous mobile station and the asynchronous radio network, are represented asynchronous. On the contrary, information unrelated to the radio resource is represented synchronous for the synchronous call control (CC) and a synchronous mobility management (MM) protocol entities of an asynchronous mobile station.

Referring to FIG. 19, information elements of a system parameters message are classified into information elements related to the radio resource and information elements unrelated to the radio resource, in order to select and transmit to the asynchronous mobile station, the information elements unrelated to the radio resource from the information elements of the system parameters message that is included in an overhead message of a synchronous system.

As shown in FIG. 19, information elements corresponding to a NON-RRC are not related to the radio resource and information elements corresponding to a RRC are related to the radio resource.

In accordance with the present invention, referring to FIG. 20, a new type of system information block is represented, in order to transmit to the asynchronous mobile station, the classified information elements unrelated to the radio resource by using a system information message that is transmitted via a broadcast control channel (BCCH).

The new type of system information block is substituted for another system information block that is formatted in a predetermined position of the system information message, and is transmitted to the asynchronous mobile station irrespective of which state the asynchronous mobile station is in, an idle mode or a connected mode.

In FIG. 20, a <maxSysInfoBlockcount> recorded in a Range Bound refers to a maximum number that is a criterion of other system information blocks.

In case the synchronous ANSI-41 core network is interlocked with the asynchronous radio network as shown in FIG. 4, the asynchronous radio network transmits a synchronous message to the asynchronous mobile station according to a procedure shown in FIG. 14 in accordance with the present invention for the synchronous call control (CC) and a synchronous mobility management (MM) protocol entities of an asynchronous mobile station.

At step S101, an asynchronous radio network determines if a ANSI-41 core network is interlocked, and if not, a logic flow proceeds to step S102 where the asynchronous radio network transmits a system information message to an asynchronous mobile station via a broadcast control channel (BCCH), otherwise the logic flow proceeds to step S103 where the asynchronous radio network generates a new system information block, contents of which are varied with information to be transmitted.

At step S104, the new system information block is formatted in the system information message.

At step S105, the system information message is transmitted to the asynchronous mobile station.

The asynchronous mobile station shown in FIG. 4 receives the system information message transmitted from the asynchronous radio network at the synchronous call control (CC) and mobility management (MM) protocol entities of the asynchronous mobile station, selects out a system parameters message that is recorded in the new system information block of the system information message and performs an operation corresponding to the selected system parameters message.

Figure 21:
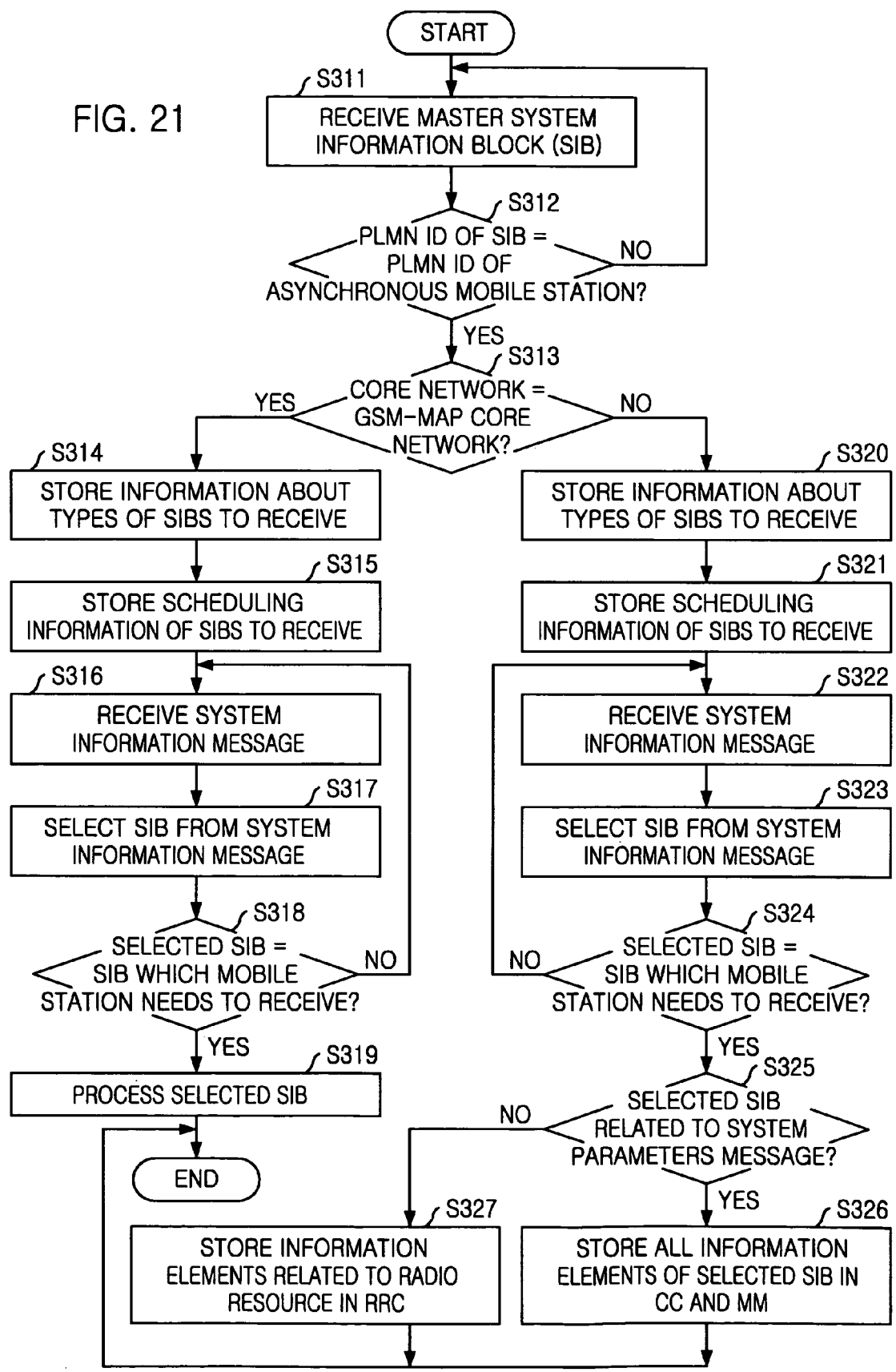
FIG. 21 is a flow chart illustrating a third embodiment of a method for processing a synchronous message at an asynchronous mobile station which receives a system information block containing the synchronous message in accordance with the present invention.

FIG. 21 shows a procedure where an asynchronous mobile station receives and processes a system parameters message included in an overhead message that is used in a synchronous system, based on a system information message that is used in an asynchronous system.

At step S311, the asynchronous mobile station receives a master system information block transmitted from an asynchronous radio network via a broadcast control channel (BCCH).

At step S312, the asynchronous mobile station determines if a public land mobile network identity (PLMN ID) among information elements that are contained in the master system information block, is equal to a PLMN ID stored in the asynchronous mobile station, and if not, after the master system information block is cleared, the logic flow returns to the step S311, otherwise the logic flow proceeds to step S313.

At step the S313, the asynchronous mobile station determines if a type of a core network is a global system for mobile communications-mobile application part (GSM-MAP), and if not, the logic flow proceeds to step S320, otherwise proceeds to step S314 where information about a type of system information blocks is stored in the asynchronous mobile station that the asynchronous mobile station should cyclically receive via the system information message, based on the master system information block.

At step S315, scheduling information about the system information blocks is stored in the asynchronous mobile station that the asynchronous mobile station should cyclically receive via the system information message, based on the master system information block.

At step S316, the asynchronous mobile station receives the system information message.

At step S317, a system information block is selected from the received system information message.

At step S318, the asynchronous mobile station determines if the selected system information block is equal to a system information block (SIB) that the asynchronous mobile station should receive, and if not, the received system information message is cleared and the logic flow returns to the step S316, otherwise the logic flow proceeds to step S319.

At the step S319, information related to the radio resource is stored in the RRC protocol and information unrelated to the radio resource is stored in the asynchronous CC and MM protocol entities. Then, the asynchronous mobile station awaits a next system information message.

At the step S320, information about a type of system information blocks is stored in the asynchronous mobile station that the asynchronous mobile station should cyclically receive via the system information message, based on the master system information block.

At step S321, scheduling information about the system information blocks is stored in the asynchronous mobile station that the asynchronous mobile station should cyclically receive via the system information message, based on the master system information block.

At step S322, the asynchronous mobile station receives the system information message.

At step S323, a system information block is selected from the received system information message.

At step S324, the asynchronous mobile station determines if the selected system information block is equal to a system information block (SIB) that the asynchronous mobile station should receive, and if not, the received system information message is cleared and the logic flow returns to the step S322, otherwise the logic flow proceeds to step S325.

At the step S325, the asynchronous mobile station determines if the selected system information block is related to a system parameters message, and if not, the logic flow proceeds to step S327, otherwise proceeds to step S326 where all information elements contained in the selected system information block are stored in the synchronous CC and MM protocol entities. Then, the asynchronous mobile station awaits a next system information message.

At the step S327, information related to the radio resource is stored in the RRC protocol entity. Then, a the asynchronous mobile station awaits a next system information message.

Embodiment 4

As shown in FIG. 4, in case an international mobile telecommunication-2000 (IMT-2000) system has an interlocking structure which includes an asynchronous mobile station, an asynchronous radio network and a synchronous ANSI-41 core network, a synchronous call control (CC) and a synchronous mobility management (MM) protocol entities of an asynchronous mobile station are activated. In this case, information related to a radio resource is represented asynchronous. All messages which are exchanged between the asynchronous mobile station and the asynchronous radio network, are represented asynchronous. On the contrary, information unrelated to the radio resource is represented synchronous for the synchronous call control (CC) and the synchronous mobility management (MM) protocol entities of an asynchronous mobile station.

Referring to FIG. 22, information elements of an extended global service redirection message are classified into information elements related to the radio resource and information elements unrelated to the radio resource, in order to select and transmit to the asynchronous mobile station, the information elements unrelated to the radio resource from the information elements of the extended global service redirection message that is included in an overhead message of a synchronous system.

As shown in FIG. 22, information elements corresponding to a NON-RRC are not related to the radio resource and information elements corresponding to a RRC are related to the radio resource.

In accordance with the present invention, referring to FIG. 23, a new type of system information block is represented, in order to transmit to the asynchronous mobile station, the classified information elements unrelated to the radio resource by using a system information message that is transmitted via a broadcast control channel (BCCH).

The new type of system information block is substituted for another system information block that is formatted in a predetermined position of the system information message, and is transmitted to the asynchronous mobile station irrespective of which state the asynchronous mobile station is in, an idle mode or a connected mode.

In FIG. 23, a <maxSysInfoBlockcount> recorded in a Range Bound refers to a maximum number that is a criterion of other system information blocks.

In case the synchronous ANSI-41 core network is interlocked with the asynchronous radio network as shown in FIG. 4, the asynchronous radio network transmits a synchronous message to the asynchronous mobile station according to a procedure shown in FIG. 14 in accordance with the present invention for the synchronous call control (CC) and the synchronous mobility management (MM) protocol entities of the asynchronous mobile station.

At step S101, an asynchronous radio network determines if a ANSI-41 core network is interlocked, and if not, a logic flow proceeds to step S102 where the asynchronous radio network transmits a system information message to an asynchronous mobile station via a broadcast control channel (BCCH), otherwise the logic flow proceeds to step S103 where the asynchronous radio network generates a new system information block, contents of which are varied with information to be transmitted.

At step S104, the new system information block is formatted in the system information message.

At step S105, the system information message is transmitted to the asynchronous mobile station.

The asynchronous mobile station shown in FIG. 4 receives the system information message transmitted from the asynchronous radio network at the synchronous call control (CC) and mobility management (MM) protocol entities of the asynchronous mobile station, selects out the extended global service redirection message that is recorded in the new system information block of the system information message and performs an operation corresponding to the selected extended global service redirection message.

Figure 24:
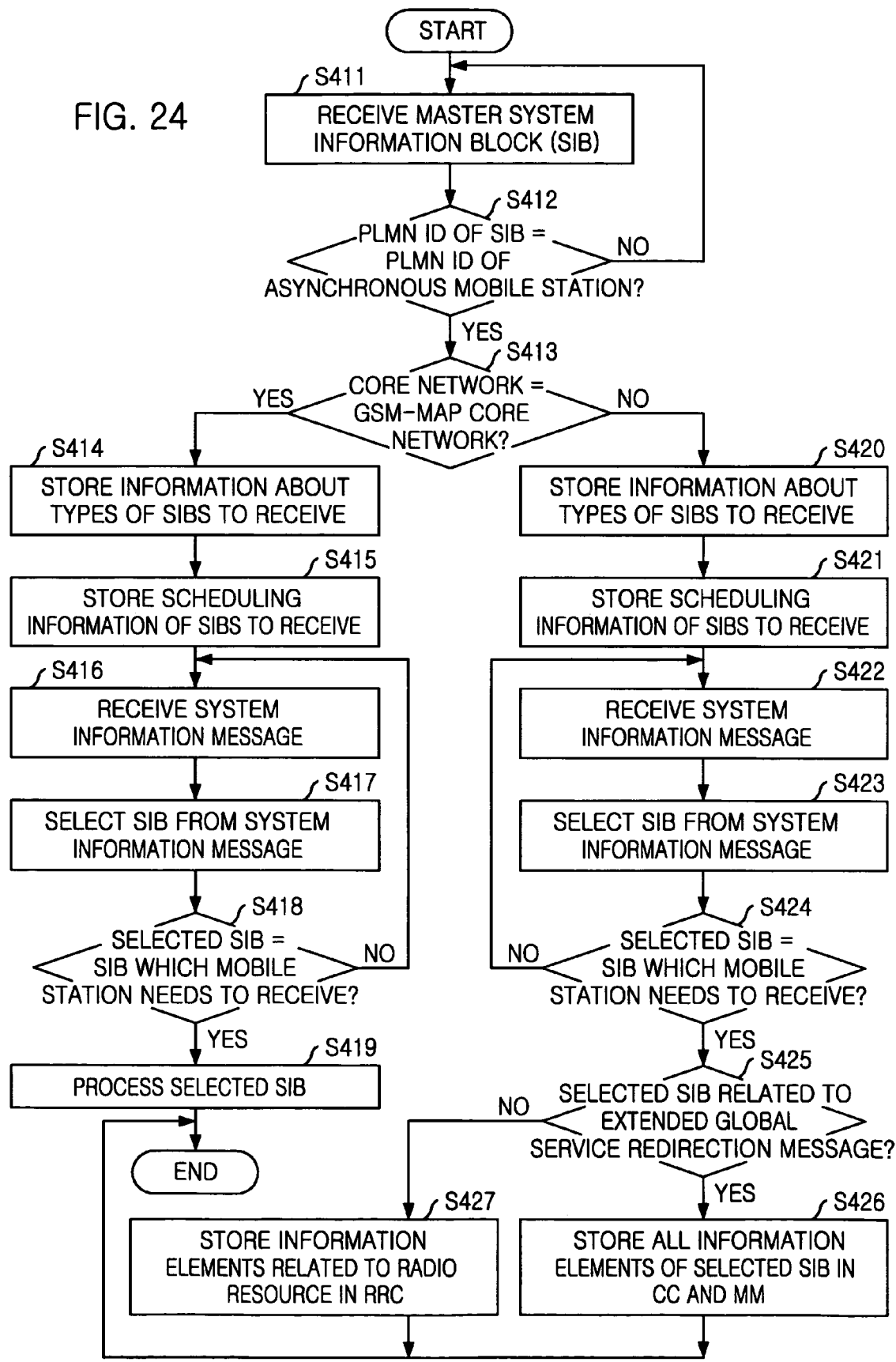
FIG. 24 is a flow chart illustrating a fourth embodiment of a method for processing a synchronous message at an asynchronous mobile station which receives a system information block containing the synchronous message in accordance with the present invention.

FIG. 24 shows a procedure where an asynchronous mobile station receives and processes the extended global service redirection message included in an overhead message that is used in a synchronous system, based on a system information message that is used in an asynchronous system.

At step S411, the asynchronous mobile station receives a master system information block transmitted from an asynchronous radio network via a broadcast control channel (BCCH).

At step S412, the asynchronous mobile station determines if a public land mobile network identity (PLMN ID) among information elements that are contained in the master system information block, is equal to a PLMN ID stored in the asynchronous mobile station, and if not, after the master system information block is cleared, the logic flow returns to the step S411, otherwise the logic flow proceeds to step S413.

At step the S413, the asynchronous mobile station determines if a type of a core network is a global system for mobile communications-mobile application part (GSM-MAP), and if not, the logic flow proceeds to step S420, otherwise proceeds to step S414 where information about a type of system information blocks is stored in the asynchronous mobile station that the asynchronous mobile station should cyclically receive via the system information message, based on the master system information block.

At step S415, scheduling information about the system information blocks is stored in the asynchronous mobile station that the asynchronous mobile station should cyclically receive via the system information message, based on the master system information block.

At step S416, the asynchronous mobile station receives the system information message.

At step S417, a system information block is selected from the received system information message.

At step S418, the asynchronous mobile station determines if the selected system information block is equal to a system information block (SIB) that the asynchronous mobile station should receive, and if not, the received system information message is cleared and the logic flow returns to the step S416, otherwise the logic flow proceeds to step S419.

At the step S419, information related to the radio resource is stored in the RRC protocol and information unrelated to the radio resource is stored in the asynchronous CC and MM protocol entities. Then, the asynchronous mobile station awaits a next system information message.

At the step S420, information about a type of system information blocks is stored in the asynchronous mobile station that the asynchronous mobile station should cyclically receive via the system information message, based on the master system information block.

At step S421, scheduling information about the system information blocks is stored in the asynchronous mobile station that the asynchronous mobile station should cyclically receive via the system information message, based on the master system information block.

At step S422, the asynchronous mobile station receives the system information message.

At step S423, a system information block is selected from the received system information message.

At step S424, the asynchronous mobile station determines if the selected system information block is equal to a system information block (SIB) that the asynchronous mobile station should receive, and if not, the received system information message is cleared and the logic flow returns to the step S422, otherwise the logic flow proceeds to step S425.

At the step S425, the asynchronous mobile station determines if the selected system information block is related to an extended global service redirection message, and if not, the logic flow proceeds to step S427, otherwise proceeds to step S426 where all information elements contained in the selected system information block are stored in the synchronous CC and MM protocol entities. Then, the asynchronous mobile station awaits a next system information message.

At the step S427, information related to the radio resource is stored in the RRC protocol entity. Then, the asynchronous mobile station awaits a next system information message.

Embodiment 5

As shown in FIG. 4, in case an international mobile telecommunication-2000 (IMT-2000) system has an interlocking structure which includes an asynchronous mobile station, an asynchronous radio network and a synchronous ANSI-41 core network, a synchronous call control (CC) and a synchronous mobility management (MM) protocol entities of an asynchronous mobile station are activated. In this case, information related to a radio resource is represented asynchronous. All messages which are exchanged between the asynchronous mobile station and the asynchronous radio network, are represented asynchronous. On the contrary, information unrelated to the radio resource is represented synchronous for the synchronous call control (CC) and the synchronous mobility management (MM) protocol entities of the asynchronous mobile station.

Referring to FIG. 25, information elements of an extended system parameters message are classified into information elements related to the radio resource and information elements unrelated to the radio resource, in order to select and transmit to the asynchronous mobile station, the information elements unrelated to the radio resource from the information elements of the extended system parameters message that is included in an overhead message of a synchronous system.

As shown in FIG. 25, information elements corresponding to a NON-RRC are not related to the radio resource and information elements corresponding to a RRC are related to the radio resource.

In accordance with the present invention, referring to FIG. 26, a new type of system information block is represented, in order to transmit to the asynchronous mobile station, the classified information elements unrelated to the radio resource by using a system information message that is transmitted via a broadcast control channel (BCCH).

The new type of system information block is substituted for another system information block that is formatted in a predetermined position of the system information message, and is transmitted to the asynchronous mobile station irrespective of which state the asynchronous mobile station is in, an idle mode or a connected mode.

In FIG. 26, a <maxSysInfoBlockcount> recorded in a Range Bound refers to a maximum number that is a criterion of other system information blocks.

In case the synchronous ANSI-41 core network is interlocked with the asynchronous radio network as shown in FIG. 4, the asynchronous radio network transmits a synchronous message to the asynchronous mobile station according to a procedure shown in FIG. 14 in accordance with the present invention for the synchronous call control (CC) and the synchronous mobility management (MM) protocol entities of the asynchronous mobile station.

At step S101, an asynchronous radio network determines if a ANSI-41 core network is interlocked, and if not, a logic flow proceeds to step S102 where the asynchronous radio network transmits a system information message to an asynchronous mobile station via a broadcast control channel (BCCH), otherwise the logic flow proceeds to step S103 where the asynchronous radio network generates a new system information block, contents of which are varied with information to be transmitted.

At step S104, the new system information block is formatted in the system information message.

At step S105, the system information message is transmitted to the asynchronous mobile station.

The asynchronous mobile station shown in FIG. 4 receives the system information message transmitted from the asynchronous radio network at the synchronous call control (CC) and mobility management (MM) protocol entities of the asynchronous mobile station, selects out the extended system parameters message that is recorded in the new system information block of the system information message and performs an operation corresponding to the selected extended system parameters message.

Figure 27:
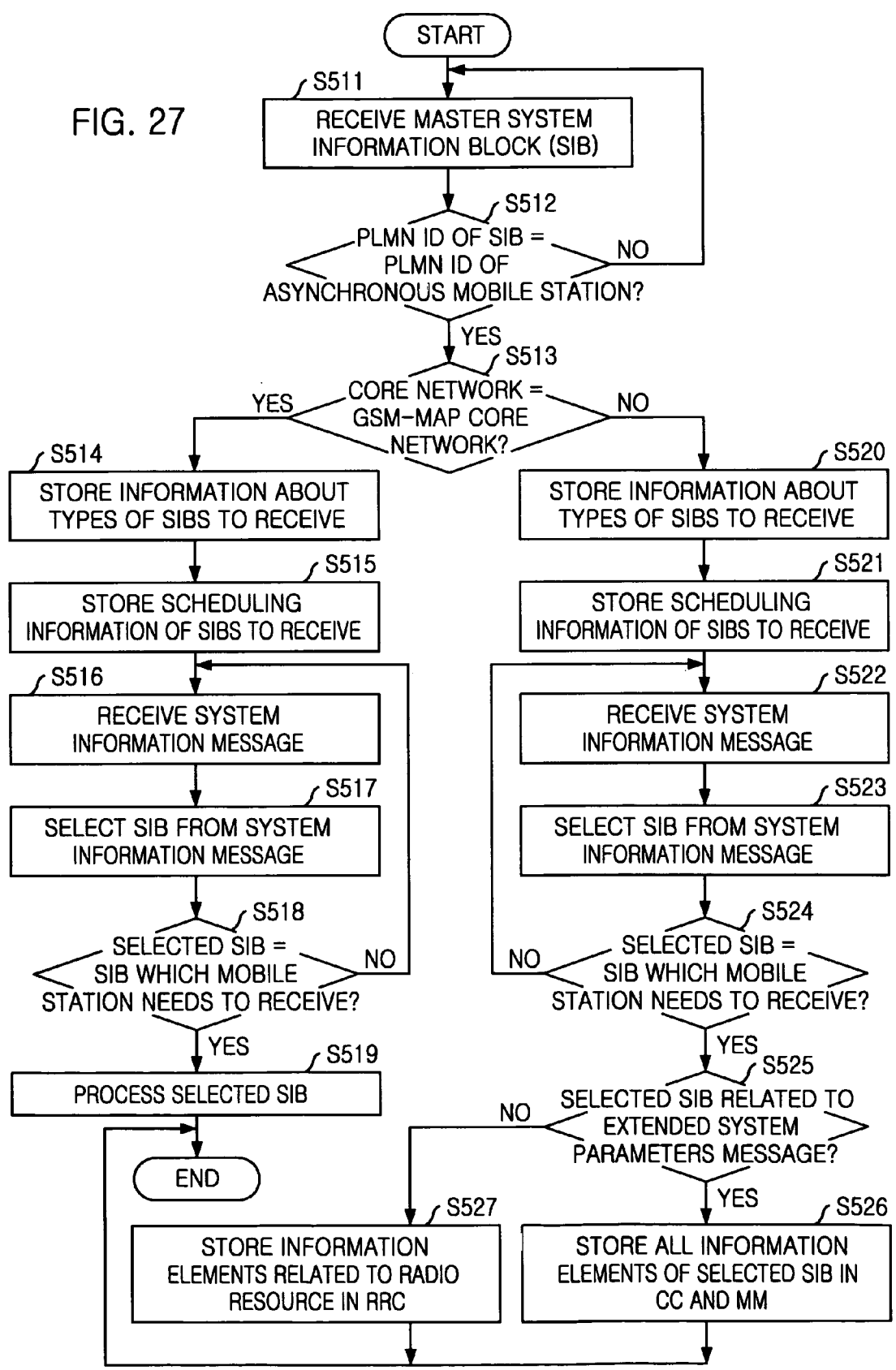
FIG. 27 is a flow chart illustrating a fifth embodiment of a method for processing a synchronous message at an asynchronous mobile station which receives a system information block containing the synchronous message in accordance with the present invention.

FIG. 27 shows a procedure where an asynchronous mobile station receives and processes the extended system parameters message included in an overhead message that is used in a synchronous system, based on a system information message that is used in an asynchronous system.

At step S511, the asynchronous mobile station receives a master system information block transmitted from an asynchronous radio network via a broadcast control channel (BCCH).

At step S512, the asynchronous mobile station determines if a public land mobile network identity (PLMN ID) among information elements that are contained in the master system information block, is equal to a PLMN ID stored in the asynchronous mobile station, and if not, after the master system information block is cleared, the logic flow returns to the step S511, otherwise the logic flow proceeds to step S513.

At step the S513, the asynchronous mobile station determines if a type of a core network is a global system for mobile communications-mobile application part (GSM-MAP), and if not, the logic flow proceeds to step S520, otherwise proceeds to step S514 where information about a type of system information blocks is stored in the asynchronous mobile station that the asynchronous mobile station should cyclically receive via the system information message, based on the master system information block.

At step S515, scheduling information about the system information blocks is stored in the asynchronous mobile station that the asynchronous mobile station should cyclically receive via the system information message, based on the master system information block.

At step S516, the asynchronous mobile station receives the system information message.

At step S517, a system information block is selected from the received system information message.

At step S518, the asynchronous mobile station determines if the selected system information block is equal to a system information block (SIB) that the asynchronous mobile station should receive, and if not, the received system information message is cleared and the logic flow returns to the step S516, otherwise the logic flow proceeds to step S519.

At the step S519, information related to the radio resource is stored in the RRC protocol and information unrelated to the radio resource is stored in the asynchronous CC and MM protocol entities. Then, the asynchronous mobile station awaits a next system information message.

At the step S520, information about a type of system information blocks is stored in the asynchronous mobile station that the asynchronous mobile station should cyclically receive via the system information message, based on the master system information block.

At step S521, scheduling information about the system information blocks is stored in the asynchronous mobile station that the asynchronous mobile station should cyclically receive via the system information message, based on the master system information block.

At step S522, the asynchronous mobile station receives the system information message.

At step S523, a system information block is selected from the received system information message.

At step S524, the asynchronous mobile station determines if the selected system information block is equal to a system information block (SIB) that the asynchronous mobile station should receive, and if not, the received system information message is cleared and the logic flow returns to the step S522, otherwise the logic flow proceeds to step S525.

At the step S525, the asynchronous mobile station determines if the selected system information block is related to an extended system parameters message, and if not, the logic flow proceeds to step S527, otherwise proceeds to step S526 where all information elements contained in the selected system information block are stored in the synchronous CC and MM protocol entities. Then, the asynchronous mobile station awaits a next system information message.

At the step S527, information related to the radio resource is stored in the RRC protocol entity. Then, the asynchronous mobile station awaits a next system information message.

Embodiment 6

As shown in FIG. 4, in case an international mobile telecommunication-2000 (IMT-2000) system has an interlocking structure which includes an asynchronous mobile station, an asynchronous radio network and a synchronous ANSI-41 core network, a synchronous call control (CC) and a synchronous mobility management (MM) protocol entities of an asynchronous mobile station are activated. In this case, information related to a radio resource is represented asynchronous. All messages which are exchanged between the asynchronous mobile station and the asynchronous radio network, are represented asynchronous. On the contrary, information unrelated to the radio resource is represented synchronous for the synchronous call control (CC) and the synchronous mobility management (MM) protocol entities of the asynchronous mobile station.

Referring to FIG. 28, information elements of a global service redirection message are classified into information elements related to the radio resource and information elements unrelated to the radio resource, in order to select and transmit to the asynchronous mobile station, the information elements unrelated to the radio resource from the information elements of the global service redirection message that is included in an overhead message of a synchronous system.

As shown in FIG. 28, information elements corresponding to a NON-RRC are not related to the radio resource and information elements corresponding to a RRC are related to the radio resource.

In accordance with the present invention, referring to FIG. 29, a new type of system information block is represented, in order to transmit to the asynchronous mobile station, the classified information elements unrelated to the radio resource by using a system information message that is transmitted via a broadcast control channel (BCCH).

The new type of system information block is substituted for another system information block that is formatted in a predetermined position of the system information message, and is transmitted to the asynchronous mobile station irrespective of which state the asynchronous mobile station is in, an idle mode or a connected mode.

In FIG. 29, a <maxSysInfoBlockcount> recorded in a Range Bound refers to a maximum number that is a criterion of other system information blocks.

In case the synchronous ANSI-41 core network is interlocked with the asynchronous radio network as shown in FIG. 4, the asynchronous radio network transmits a synchronous message to the asynchronous mobile station according to a procedure shown in FIG. 14 in accordance with the present invention for the synchronous call control (CC) and the synchronous mobility management (MM) protocol entities of the asynchronous mobile station.

At step S101, an asynchronous radio network determines if a ANSI-41 core network is interlocked, and if not, a logic flow proceeds to step S102 where the asynchronous radio network transmits a system information message to an asynchronous mobile station via a broadcast control channel (BCCH), otherwise the logic flow proceeds to step S103 where the asynchronous radio network generates a new system information block, contents of which are varied with information to be transmitted.

At step S104, the new system information block is formatted in the system information message.

At step S105, the system information message is transmitted to the asynchronous mobile station.

The asynchronous mobile station shown in FIG. 4 receives the system information message transmitted from the asynchronous radio network at the synchronous call control (CC) and mobility management (MM) protocol entities of the asynchronous mobile station, selects out the global service redirection message that is recorded in the new system information block of the system information message and performs an operation corresponding to the selected global service redirection message.

Figure 30:
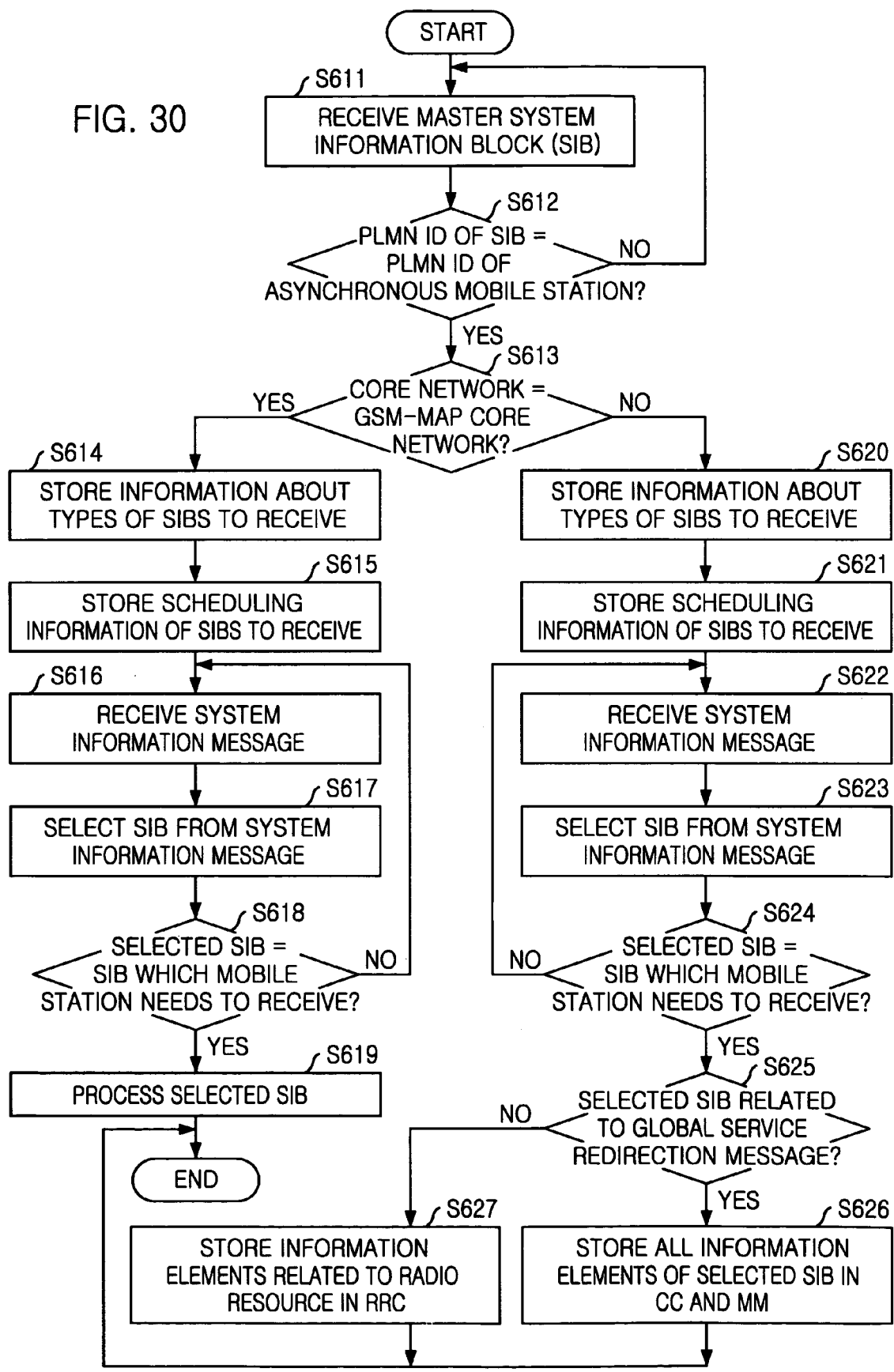
FIG. 30 is a flow chart illustrating a sixth embodiment of a method for processing a synchronous message at an asynchronous mobile station which receives a system information block containing the synchronous message in accordance with the present invention.

FIG. 30 shows a procedure where an asynchronous mobile station receives and processes the global service redirection message included in an overhead message that is used in a synchronous system, based on a system information message that is used in an asynchronous system.

At step S611, the asynchronous mobile station receives a master system information block transmitted from an asynchronous radio network via a broadcast control channel (BCCH).

At step S612, the asynchronous mobile station determines if a public land mobile network identity (PLMN ID) among information elements that are contained in the master system information block, is equal to a PLMN ID stored in the asynchronous mobile station, and if not, after the master system information block is cleared, the logic flow returns to the step S511, otherwise the logic flow proceeds to step S613.

At step the S613, the asynchronous mobile station determines if a type of a core network is a global system for mobile communications-mobile application part (GSM-MAP), and if not, the logic flow proceeds to step S620, otherwise proceeds to step S614 where information about a type of system information blocks is stored in the asynchronous mobile station that the asynchronous mobile station should cyclically receive via the system information message, based on the master system information block.

At step S615, scheduling information about the system information blocks is stored in the asynchronous mobile station that the asynchronous mobile station should cyclically receive via the system information message, based on the master system information block.

At step S616, the asynchronous mobile station receives the system information message.

At step S617, a system information block is selected from the received system information message.

At step S618, the asynchronous mobile station determines if the selected system information block is equal to a system information block (SIB) that the asynchronous mobile station should receive, and if not, the received system information message is cleared and the logic flow returns to the step S516, otherwise the logic flow proceeds to step S619.

At the step S619, information related to the radio resource is stored in the RRC protocol and information unrelated to the radio resource is stored in the asynchronous CC and MM protocol entities. Then, the asynchronous mobile station awaits a next system information message.

At the step S620, information about a type of system information blocks is stored in the asynchronous mobile station that the asynchronous mobile station should cyclically receive via the system information message, based on the master system information block.

At step S621, scheduling information about the system information blocks is stored in the asynchronous mobile station that the asynchronous mobile station should cyclically receive via the system information message, based on the master system information block.

At step S622, the asynchronous mobile station receives the system information message.

At step S623, a system information block is selected from the received system information message.

At step S624, the asynchronous mobile station determines if the selected system information block is equal to a system information block (SIB) that the asynchronous mobile station should receive, and if not, the received system information message is cleared and the logic flow returns to the step S622, otherwise the logic flow proceeds to step S625.

At the step S625, the asynchronous mobile station determines if the selected system information block is related to a global service redirection message, and if not, the logic flow proceeds to step S627, otherwise proceeds to step S626 where all information elements contained in the selected system information block are stored in the synchronous CC and MM protocol entities. Then, the asynchronous mobile station awaits a next system information message.

At the step S627, information related to the radio resource is stored in the RRC protocol entity. Then, the asynchronous mobile station awaits a next system information message.

Also, it is necessary to provide a method for generating a system information block of a new concept so that it is possible to perform a good data interface between the asynchronous mobile station, the asynchronous radio network and the synchronous core network, in case the synchronous core network is interlocked with the asynchronous mobile communication system.

In other words, a new system information block should be generated, in order that the asynchronous radio network transmits information fields related to the synchronous core network to the asynchronous mobile station.

In this case, the new system information block is generated, based on following criteria of an area scope, a modification frequency, a user equipment (UE) mode and a core network (CN) type.

The area scope, the modification frequency and the user equipment are used as criteria for generating the system information block in the conventional asynchronous mobile communication system.

Considering that the synchronous core network is interlocked with the asynchronous radio network, the CN type is added in the criteria in accordance with the present invention. The CN type is used as criteria for determining whether a currently generated system information block has information fields related to the GSM-MAP core network or the ANSI-41 core network.

Figure 31A:
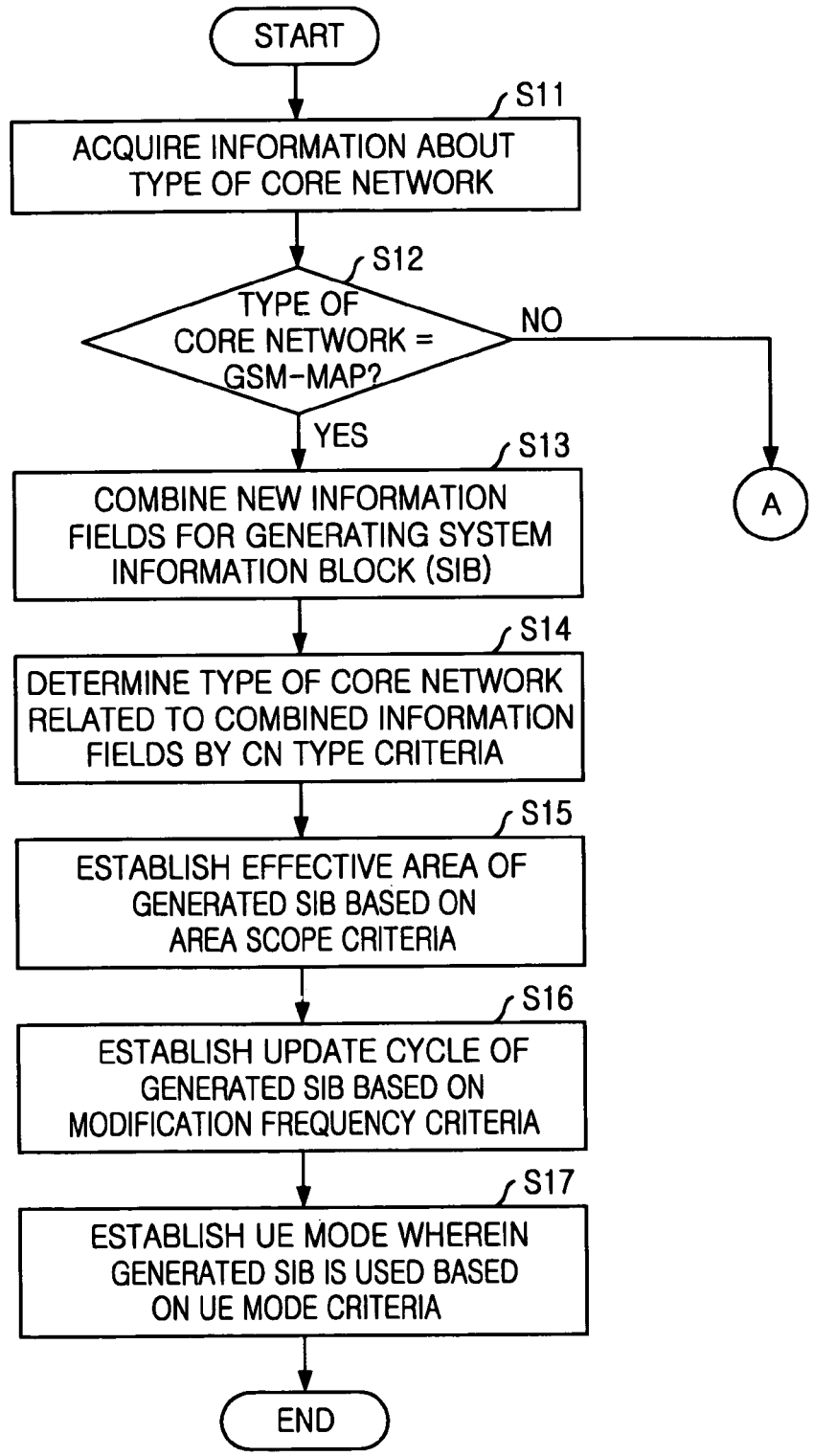
FIG. 31 is a flow chart illustrating a method for generating a new type of a system information block corresponding to a type of an interlocked core network in accordance with the present invention.

FIG. 31 is a flow chart illustrating a method for generating a system information block corresponding to a type of an interlocked core network in accordance with the present invention.

Referring to FIG. 31, at step S111, the asynchronous radio network acquires information about a type of the core network interlocked with it by exchanging a message with the core network.

At step S12, the asynchronous radio network determines the type of the core network.

If the type of the core network is the asynchronous GSM-MAP core network, at step S13, new information fields for generating the system information block are combined in the asynchronous radio network.

At step S14, the type of the core network related to the combined new information fields is determined, based on a core network (CN) type criteria. In this case, a determined type of the core network is the GSM-MAP core network.

At step S15, an effective area in which the combined new information fields are used is defined, based on area scope criteria. The effective area refers to a cell size or a size of a universal mobile telecommunication system registration area (URA) including a plurality of cells. The effective area is determined, based on a characteristic of the combined new information fields.

At step S16, an update cycle of the combined new information fields is determined, based on modification frequency criteria. If the combined new information fields are information related to a radio resource, the update cycle having a short cycle time and if the combined new information fields are information unrelated to the radio resource, the update cycle having the long cycle time is determined, by analyzing the characteristic and a utility of the combined new information fields.

At step S17, a user equipment (UE) mode wherein the combined new information fields are used is determined, based on UE mode criteria. It is determined whether the combined new information fields are used in an idle mode or a connected mode of the UE, by analyzing the characteristic and the utility of the combined new information fields.

A new system information block is generated by the above procedure.

If the type of the core network is the synchronous ANSI-41 core network, at step S18, new information fields for generating the system information block are combined in the asynchronous radio network.

At step S19, it is determined whether the combined new information fields are related to the asynchronous system or the synchronous system.

If the combined new information fields are related to the asynchronous system, at step S20, the type of the core network related to the combined new information fields is determined, based on a core network (CN) type criteria. In this case, a determined type of the core network is the GSM-MAP core network.

At step S21, an effective area in which the combined new information fields are used is defined, based on area scope criteria. The effective area refers to a cell size or a size of a universal mobile telecommunication system registration area (URA) including a plurality of cells. The effective area is determined, based on a characteristic of the combined new information fields.

At step S22, an update cycle of the combined new information fields is determined, based on modification frequency criteria. If the combined new information fields are information related to a radio resource, the update cycle having a short cycle time and if the combined new information fields are information unrelated to the radio resource, the update cycle having the long cycle time is determined, by analyzing the characteristic and a utility of the combined new information fields.

At step S23, a user equipment (UE) mode wherein the combined new information fields are used is determined, based on UE mode criteria. It is determined whether the combined new information fields are used in an idle mode or a connected mode of the UE, by analyzing the characteristic and the utility of the combined new information fields.

A new system information block is generated by the above procedure.

As the result of the determination at the step S19, if the combined new information fields are related to the synchronous system, at step S24, the type of the core network related to the combined new information fields is determined, based on a core network (CN) type criteria. In this case, a determined type of the core network is the ANSI-41 core network.

At step S25, an effective area in which the combined new information fields are used is defined, based on area scope criteria. The effective area refers to a cell size or a size of a universal mobile telecommunication system registration area (URA) including a plurality of cells. The effective area is determined, based on a characteristic of the combined new information fields.

At step S26, an update cycle of the combined new information fields is determined, based on modification frequency criteria. If the combined new information fields are information related to a radio resource, the update cycle having a short cycle time and if the combined new information fields are information unrelated to the radio resource, the update cycle having the long cycle time is determined, by analyzing the characteristic and a utility of the combined new information fields.

At step S27, a user equipment (UE) mode wherein the combined new information fields are used is determined, based on UE mode criteria. It is determined whether the combined new information fields are used in an idle mode or a connected mode of the UE, by analyzing the characteristic and the utility of the combined new information fields.

A new system information block is generated by the above procedure.

The new system information block generated as described above is inserted in a system information message and then transmitted to the asynchronous mobile station via a broadcast control channel (BCCH).

Accordingly, even when the synchronous ANSI-41 core network is interlocked with the asynchronous mobile communication system, a subscriber of the asynchronous mobile communication system can use a service provided from the ANSI-41 core network without changing a structure of the asynchronous mobile communication system or the structure of messages by generating the new type of the system information block.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for processing a synchronous message at an asynchronous mobile station in an asynchronous mobile communication system, wherein the asyncnronous mobile station and an asynchronous radio network are included, the method comprising the steps of:
   a) receiving a system information block transmitted via a broadcast control channel;
   b) determining an operating type of a core network;
   c) when the operating type of the core network is synchronous, selecting the system information block from a system information message;
   d) analyzing the selected system information block;
   e) if the selected system information block is related to a message used in a synchronous system, storing information related to the message in a synchronous call control (CC) entity arid a synchronous mobility management (MM) entity; and
   f) if the selected system information block is unrelated to the message used in the synchronous system, storing information related to a radio resource in a radio resource control (RRC) entity.

2. The method as recited in claim 1, wherein the step e) includes the step of:
   if the selected system information block includes information related to a user zone identification message, storing the information related to the user zone identification message in the synchronous call control (CC) entity and the synchronous mobility management (MM) entity.

3. The method as recited in claim 1, wherein the step e) further includes the step of:
   if the selected system information block includes information related to a private neighbor list message, storing the information related to the private neighbor list message in the synchronous call control (CC) entity and the synchronous mobility management (MM) entity.

4. The method as recited in claim 1, wherein the step e) further includes the step of:
   if the selected system information block includes information related to a system parameters message, storing the information related to the system parameters message in the synchronous call control (CC) entity and the synchronous mobility management (MM) entity.

5. The method as recited in claim 1, wherein the step e) further includes the step of:
  if the selected system information block includes information related to an extended global service redirection message, storing the information related to the extended global service redirection message in the synchronous call control (CC) entity and the synchronous mobility management (MM) entity.

6. The method as recited in claim 1, wherein the step e) further includes the step of:
  if the selected system information block includes information related to an extended system parameters message, storing the information related to the extended system parameters message in the synchronous call control (CC) entity and the synchronous mobility management (MM) entity.

7. The method as recited in claim 1, wherein the step e) further includes the step of:
  if the selected system information block includes information related to a global service redirection message, storing the information related to the global service redirection message in the synchronous call control (CC) entity and the synchronous mobility management (MM) entity.

* * * * *